US010427884B2

(12) United States Patent
Schroader

(10) Patent No.: US 10,427,884 B2
(45) Date of Patent: Oct. 1, 2019

(54) VISION BASED CONVEYOR PACKAGE DENSITY MANAGEMENT SYSTEM

(71) Applicant: FIVES INTRALOGISTICS CORP., Louisville, KY (US)

(72) Inventor: Steven Vann Schroader, Louisville, KY (US)

(73) Assignee: Fives Intralogistics Corp., Louisville, KY (US)

( * ) Notice: Subject to any disclaimer, the term of this patent is extended or adjusted under 35 U.S.C. 154(b) by 0 days.

(21) Appl. No.: 15/977,224

(22) Filed: May 11, 2018

(65) Prior Publication Data

US 2018/0339865 A1 Nov. 29, 2018

Related U.S. Application Data

(63) Continuation-in-part of application No. PCT/US2018/031453, filed on May 7, 2018, and a continuation-in-part of application No. PCT/US2018/031278, filed on May 5, 2018, and a
(Continued)

(30) Foreign Application Priority Data

Jun. 14, 2017 (EP) .................................. 158758224

(51) Int. Cl.
| B65G 43/08 | (2006.01) |
| B65G 43/10 | (2006.01) |
| B65G 47/68 | (2006.01) |
| G06K 9/00 | (2006.01) |
| B65G 47/31 | (2006.01) |

(52) U.S. Cl.
CPC ............. *B65G 43/08* (2013.01); *B65G 43/10* (2013.01); *B65G 47/31* (2013.01); *B65G 47/681* (2013.01); *G06K 9/00771* (2013.01); *B65G 2203/041* (2013.01); *B65G 2207/08* (2013.01); *B65G 2811/0673* (2013.01)

(58) Field of Classification Search
CPC ................................ B65G 43/08; B65G 47/71
USPC ......... 198/443, 444, 448, 436, 464.1, 464.2, 198/464.3, 464.4, 571, 572, 575, 576, 198/577; 700/228, 229, 230
See application file for complete search history.

(56) References Cited

U.S. PATENT DOCUMENTS

| 5,141,097 A | 8/1992 | Oiry et al. |
| 5,165,520 A | 11/1992 | Herve et al. |
| 5,871,078 A | 2/1999 | Arnarson et al. |

(Continued)

*Primary Examiner* — Gene O Crawford
*Assistant Examiner* — Lester Rushin, III
(74) *Attorney, Agent, or Firm* — Carrithers Law Office, PLLC; David W. Carrithers

(57) ABSTRACT

A camera based vision system that recognizes and maximizes belt area utilization. A plurality of cameras are positioned at flow entry points of feed conveyors and at the singulator. The control algorithm recognizes individual items area, the rate at which individual objects are passing, and the area utilization of the collector belt. The video camera and computer based conveyor package management system monitor and control the number and size of the packages present on the infeed conveyors, collector conveyor, singulator conveyor and sorting conveyor in a package handling system wherein the camera data is used to measure the available area or space on the conveyors to maintain a desired density of packages on selected conveyor (s). The conveyor speed is controlled as a function of occupancy on a collector or just prior to a singulator or receiver.

34 Claims, 12 Drawing Sheets

Related U.S. Application Data continuation-in-part of application No. 15/588,230, filed on May 5, 2017, now Pat. No. 10,226,795.

(60) Provisional application No. 62/391,653, filed on May 5, 2016.

(56) References Cited

U.S. PATENT DOCUMENTS

| | | |
|---|---|---|
| 6,401,936 B1 | 6/2002 | Isaacs et al. |
| 6,471,044 B1 | 10/2002 | Issacs et al. |
| 6,629,018 B2 | 9/2003 | Mondie et al. |
| 6,729,463 B2 | 5/2004 | Pfeiffer |
| 6,751,524 B2 | 6/2004 | Neary et al. |
| 7,191,895 B2 | 3/2007 | Zeitler et al. |
| 7,413,071 B2 | 8/2008 | Zeitler et al. |
| 7,591,365 B2 | 9/2009 | Knepple et al. |
| 7,631,747 B2 | 12/2009 | Zeitler |
| 8,061,506 B2 | 11/2011 | Schafer |
| 8,201,681 B2 | 6/2012 | Schiesser et al. |
| 8,360,230 B2 | 1/2013 | Rompe |
| 8,408,380 B2 | 4/2013 | Doane |
| 2001/0030102 A1 | 10/2001 | Woltjer et al. |
| 2001/0035332 A1 | 11/2001 | Zeitler |
| 2003/0141165 A1 | 7/2003 | Reznik et al. |
| 2007/0246328 A1 | 10/2007 | Reznik |
| 2009/0114575 A1 | 5/2009 | Carpenter et al. |
| 2009/0145967 A1 | 6/2009 | Carpenter |
| 2009/0250311 A1 | 10/2009 | Honegger |
| 2010/0012464 A1 | 1/2010 | Schiesser et al. |
| 2010/0155194 A1 | 6/2010 | Schafer |
| 2011/0056798 A1 | 3/2011 | Vok et al. |
| 2011/0214964 A1 | 9/2011 | Zimmermann |
| 2011/0240439 A1 | 10/2011 | Rompe |
| 2013/0056329 A1 | 3/2013 | Grootherder |
| 2014/0121826 A1 | 5/2014 | Kreitmeier et al. |
| 2014/0364998 A1 | 12/2014 | Neiser et al. |

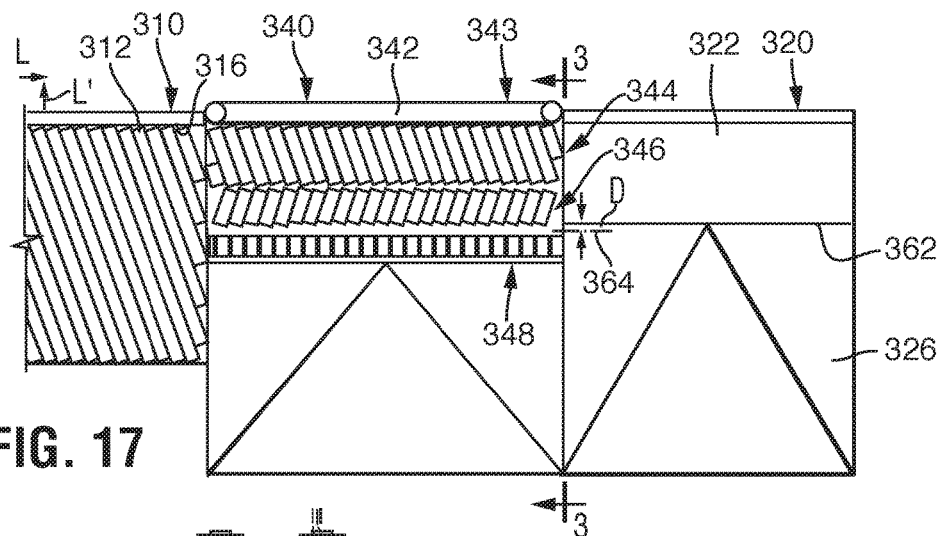
FIG. 17
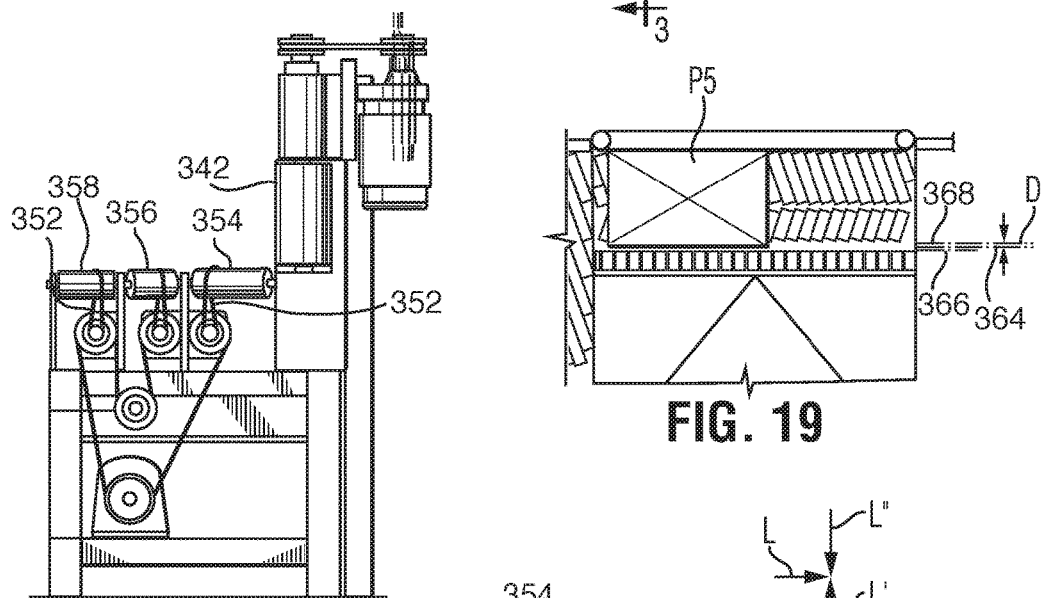
FIG. 18
FIG. 19
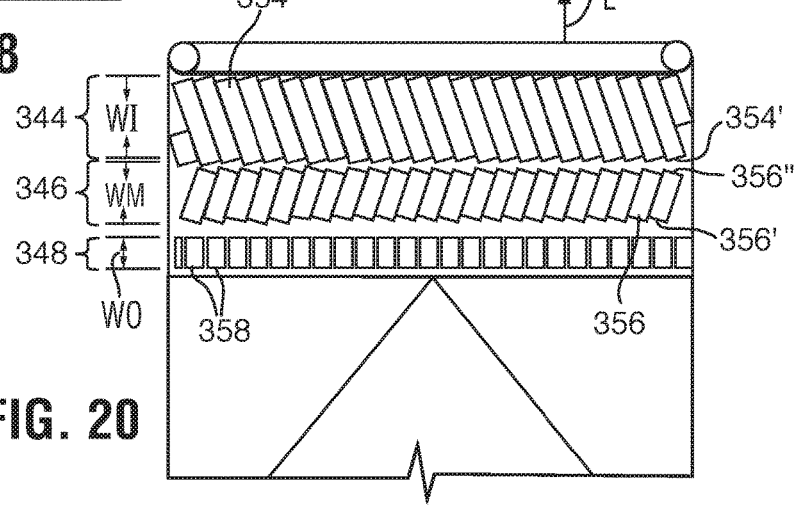
FIG. 20

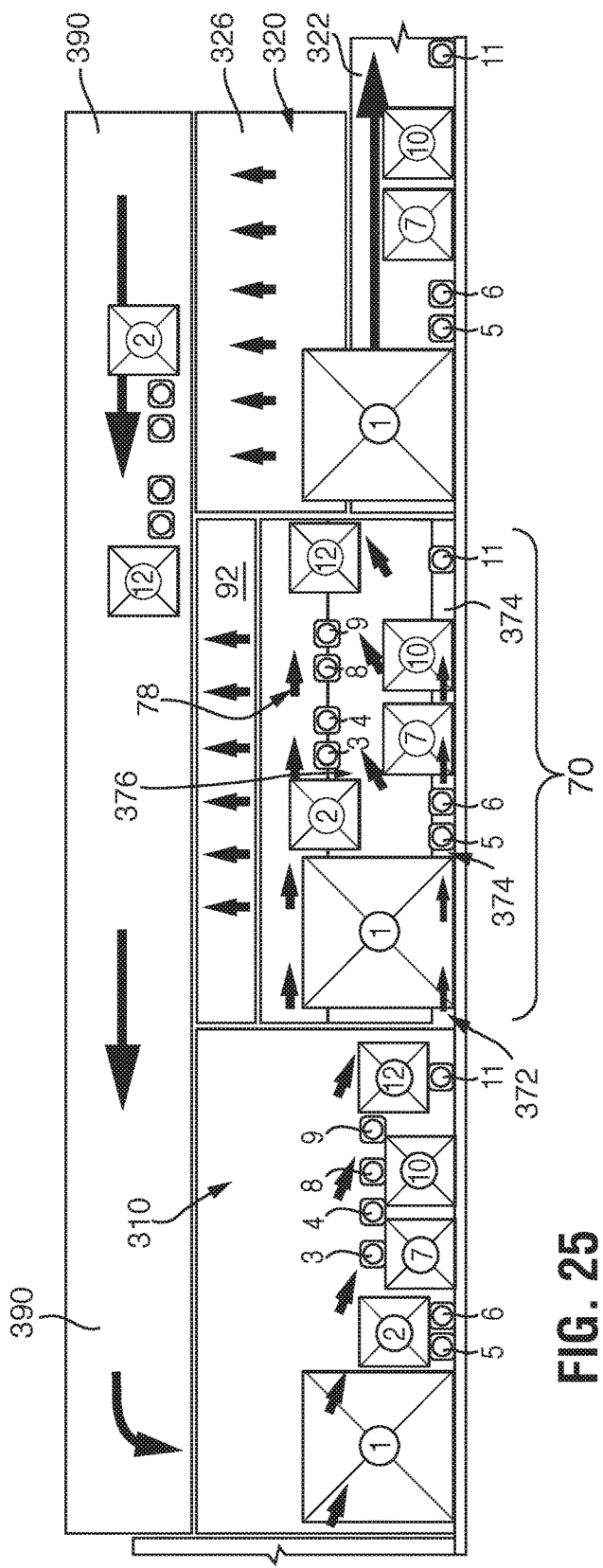
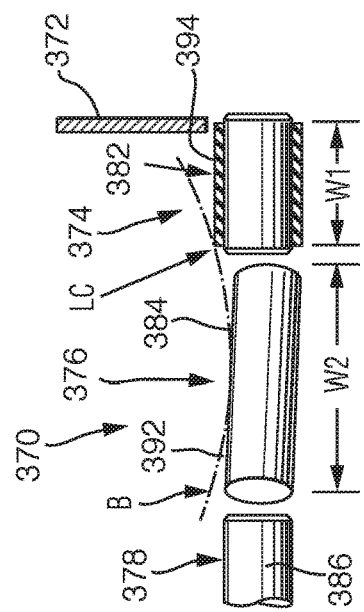
FIG. 25
FIG. 26

VISION BASED CONVEYOR PACKAGE DENSITY MANAGEMENT SYSTEM

CROSS REFERENCES TO RELATED APPLICATIONS

This application is a continuation in part of U.S. application Ser. No. 15/588,230 filed on May 5, 2017 which claims priority from U.S. Provisional Application Ser. No. 62/391,653 filed on May 5, 2016, and is a continuation in part and claims priority from PCT/US18/31278 filed on May 5, 2018, and PCT/US18/31453 filed on May 7, 2018, and EPO Application S.N. 158758224.3-1731 filed on Jun. 14, 2017 claiming priority from PCT/US15/000481 filed on Dec. 31, 2015 claiming priority from U.S. Provisional Application Ser. No. 62/124,735 filed on Dec. 31, 2014 all of which are incorporated by reference herein in their entirety.

TECHNICAL FIELD

The present invention relates to the field of vision systems used to enhance the performance and throughput of conveyor systems.

BACKGROUND OF THE INVENTION

Conveying systems often serve the function of aligning and spacing articles on the conveying system to be processed by a downstream sorting system. Conventional conveyance systems typically involves controlling the articles in such a way that the articles leaving the induction subsystem have gaps between them that are close to a desired length. The desired gap may be variable depending upon the length and/or width of one or more of the pair of articles that define the gap, or the desired gap may be constant. Regardless of the criteria used to determine the length of the desired gap, the gap serves the purpose of facilitating the sorting of the articles. Sorting systems often function more effectively if the articles being sorted have a certain minimum gap between them. However, gaps exceeding this minimum will generally decrease the throughput of the conveying system. It is desirable to create gaps that balance sortation criteria while maximizing the throughput to the sorting and singulator apparatus; however, at the point of induction where the parcels are fed onto a plurality of conveyors from various feed points such as truck unloading stations, maximum efficiency is achieved by moving as many parcels as possible on a given area of the conveyor.

Due to the variability of the amount of product coming in on various infeed belts, imbalances occur at different merge areas in the conveying system causing large open spots on the collector belt, singulator belt and sorting area. This fact causes inefficiency, an unnecessary investment in equipment, and a degradation of overall throughput to the sorter. Conventional flow management systems count packages and/or control the speed of conveyors to orient or singulate packages and create a desired minimum gap there between for processing. Examples of these devices is set forth in the following patent and/or publication:

U.S. Pat. No. 5,165,520 teaches a conveying system which spaces parcels on a belt and includes a camera system which recognizes overlapping or crowding of parcels and diverts the offending parcels. U.S. Pat. No. 8,061,506 teaches merging articles onto conveyors using information gathered from optical sensors or cameras to recognize or create an gas on a collector belt and fill these gaps with a package from an infeed belt; however, Schafer does not discuss the method of processing information from cameras or optical sensors to control the concentration of same. Publication (WO200066280) describes a system using a camera to determine the number of parcels and uses this information to control the speed conveyors such as a parcel feeder conveyor, acceleration conveyor, buffer conveyor, singulator and transportation conveyor; however, the reference does not teach nor suggest the idea of controlling the speed of conveyance in order to maximize the area covered on the conveyor as a function of occupancy on a collector or just prior to singulator. U.S. Pat. No. 6,471,044 teaches that images are transferred to a control system where the images are interpreted to determine the number of packages and the average size of the packages to regulate the speed of the parcel feeder conveyor, buffer conveyor, acceleration conveyor, singulator, and transport conveyor, but not the density of the packages on a given area of the conveyor. U.S. Pat. No. 5,141,097 teaches analysis of an image supplied by a camera to provide an indication of the number of packages present in this image and increase the conveyor speed to obtain the desired throughput. U.S. Pat. No. 6,401,936 teaches a detection system for monitoring the stream of articles and identifying and/or tracking individual items passing through the system used in conjunction with a singulator, hold-and-release or strip conveyor downstream from the coarse singulator wherein the control system is utilized in connection with the detection system to regulate the flow of articles through the system by increasing the speed of the conveyor.

Flow management is an essential component of systems that incorporate linear parcel singulator. Flow conditions are typically controlled by one or more separation or accumulator devices in order to control the input flow to the system. The singulator serves as a buffering element in the system, but has its capacitive limits, and a degree of flow management is necessary to avoid over-feeding. A singulator will only allow a single file stream of parcels to exit. When excessive flow is input, parcels are re-circulated. If excessive input flow continues, an excessive number of items can accumulate within the singulator, eventually leading to jams and excessive parcel pressure and damage.

Conventional systems utilize methods of either counting carton feet or parcels released from the container unload conveyors, and adjusting the speeds of the unload conveyors to maintain the input flow at a manageable level for the singulator and sorter. The goal is to keep the system fed, without over-feeding. However, these current methods are fairly inaccurate and in order to avoid over-feeding, the calculations used in the algorithm must be fairly conservative in order to avoid over-feeding. Current FDXG systems have sorter capacity of 12,150 parcels per hour (pph) with a 12 inch gap at 540 feet per minute (fpm), and with a 20 inch average. The result is that the system throughput efficiency is limited, and typical sustained performance capability is only expected to be about 60% of sorter capacity. There is a need for a control system to maximize the occupancy and density of packages on a given area of a conveyor upstream of a singulator device or receiver.

SUMMARY OF THE INVENTION

The vision based bulk parcel flow management system comprises or consists of a camera based vision system that recognizes belt area utilization, and parcel count. A system with cameras positioned at flow entry points and at the singulator. The control algorithm requires recognition of individual items and the rate at which individual objects are passing, and the area utilization of the collector belt. Average parcel size can be considered as well. The present invention provides a means for increasing conveyor area and controlling density. The video based conveyor package management system may also identify, locate, or trace a package, parcel, or other item on the conveyor by its digital image or footprint.

In accordance with the present invention, there is provided a video/camera based conveyor package management system comprising, consisting of, or consisting essentially of a programmable logic controller or computer and camera, video camera or other pixel detecting and/or digital imaging devices (collectively referred to as video cameras), a collector conveyor including separate sections of conveyor separately driven by individual motors with individual speed controllers, selected ones of the sections of the collector conveyor having means such as low friction conveying surfaces such as skewed rollers or high friction conveying surfaces capable of urging a package to a selected side of the collector conveyor, a plurality of infeed conveyors including separate sections of conveyor separately driven by individual motors with individual speed controllers, first video cameras monitoring areas of the collector conveyor leading up to merge areas of each of the infeed conveyors with the collector conveyor, second video cameras monitoring areas of the infeed conveyor leading up to merge areas of each of the infeed conveyors with the collector conveyor, and a control program within the video computer capable of controlling speeds of the sections of the collector conveyor and of the sections of the infeed conveyors based on a calculated amount of free space on a given collector section compared to a footprint of a package on an oncoming infeed conveyor, as calculated on a pixel by pixel basis providing digital information. A singulator conveyor may be incorporated within the conveyor system and fed by the collector conveyor.

For example, the current FDXG requirements for a control conveyor of a selected area and speed is 7,500 parcels per hour over 10 minutes, with two (one minute) slices at 8250 parcels per hour, (7500/12150=0.62=62% efficiency over 10 min test). The present invention provides a means of controlling the area utilization of the available conveyor surface to obtain an efficiency of up to 75% equivalent to 9,375 parcels per hour for the same conveyor. Moreover, a 15% increase of results in an increase of 8,625 parcels per hour for the video based conveyor package management system conveyor with area utilization in accordance with the instant invention.

Cameras are positioned at selected individual input points in wired or wireless communication with a computer including a process control algorithm to recognize incoming flow density, in terms of both belt utilization and throughput rate. These measures can be used to make changes to reduce parcel input flow, and could require stoppage of the feed line, if flow is too sparse or dense. Similarly, absence of flow could be recognized prompting an increase in speed of a selected input conveyor or input conveyors.

Cameras positioned to view the singulator surface are used in a similar matter to assess the buffer capacity utilization, primarily based on area coverage recognition. This feedback is used to dynamically adapt behavior of infeed lines. The use of web cams provides added benefits in terms of system control room visibility and recordation. Variations in parameters used to tune the system can be evaluated in a more efficient manner. Jams and other system problems are better recognized.

A plurality of cameras in communication with a computer based conveyor package management system includes video cameras monitoring the number and size of the packages present a given area of an infeed conveyor, collector conveyor, singulator conveyor and sorting conveyor in a package handling system wherein the camera data is collected and analyzed to measure the available area or space on the conveyors and the density of packages thereon to maximize a desired density of packages on selected conveyor(s). The number of feed conveyors providing packages and the conveyor speed of each is controlled as a function of occupancy on a collector or just prior to a singulator. The computer feeds the camera package density information to the conveyor speed controllers to introduce packages from one or more feed conveyors to a collection conveyor wherein packages are detected by one or more cameras and the speed of selected conveyors is controlled for arrangement of the packages at optimal spacing and to fill an area of the conveyor in the most efficient manner maximizing the density of the packages on a conveyor and throughput of the system and accordingly minimizing the number of conveyors required for the system. When the computer determines there is a enough space on one of the conveyor belts, for example, the collector belt, the computer tells the controller to add a package or packages by causing an infeed belt to add a package or packages to the space or vacant area on the collector belt.

In accordance with the present invention, there is provided a video/camera based conveyor package management system comprising, consisting of, or consisting essentially of a video compute and camera or other digital or pixel detecting and/or recording devices, at least one collector conveyor including separate sections of conveyor separately driven by individual motors with individual speed controllers, selected ones of the sections of the collector conveyor having means such as skewed rollers capable of urging a package to a selected side of the collector conveyor, a plurality of infeed or induction conveyors including separate sections of conveyor separately driven by individual motors with individual speed controllers, first video cameras monitoring areas of the collector conveyor leading up to merge areas of each of the infeed conveyors with the collector conveyor, second video cameras monitoring areas of the infeed conveyor leading up to merge areas of each of the infeed conveyors with the collector conveyor, and a algorithm control program within the video computer capable of controlling speeds and movement of the sections of the various conveyor and of the sections of the infeed conveyors based on a calculated amount of free space on a given collector section compared to a footprint of a package on an oncoming infeed conveyor, as calculated on a pixel by pixel basis. A singulator conveyor may be incorporated within the conveyor system and fed by the collector conveyor.

The feed conveyors and receiving conveyors employ the principle of the conveyor area utilization, and parcel count utilizing a system with cameras positioned at flow entry points of selected conveyors controlled to efficiently feed a receiving conveyor downstream and the ratio of the velocity $V2$ of the incoming material on the feeding conveyor occupancy defined zone (FCO %) is proportional to the velocity $V1$ of the outgoing material in the designated area defining the desired occupancy of the downstream receiving conveyor after the transfer (DO %) desired occupancy. The ratio $V2/V1$ is proportional to the ratio of the area desired to be covered with articles to the incoming percentage of area that is covered by articles where the ratio=$V2/V1$=(DO %)/(FCO %).

One preferred embodiment of the vision based bulk parcel flow management system, comprises or consists of a feed conveyor and a receiving conveyor each one having independent drive motors; a transition zone between the feed conveyor and the receiving conveyor; a camera field of view of the selected transition zone; an inline feeding conveyor speed to achieve a desired conveyor area utilization on a down stream receiving conveyor according to the formula V2 (conveyor velocity of incoming items from feed conveyor)=V1 (conveyor velocity outgoing items on receiver conveyor)×2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density) wherein occupancy comprises conveyor area, conveyor volume, or conveyor density); a camera providing a selected field of view; a feeding conveyor having a selected occupancy defined zone; a receiving conveyor having a selected occupancy defined zone; a section selected included a percentage of the desired occupancy after the merger; a receiving conveyor having a selected occupancy defined zone; a conveyor area including a desired occupancy zone at a selected position; a transition section between the feeding conveyor and the receiving conveyor for merging the parcels from one to another; and a computer for controlling the conveyor speed and movement based upon signals received from the cameras identifying gaps between packages on the receiving conveyor of sufficient space for insertion of an additional package from the feeding conveyor.

More particularly, the video based conveyor area utilization system comprises or consists of a feed conveyor; a receiving conveyor comprising a receiving conveyor including separate sections of conveyor modules independently driven by individual motors with individual speed controllers; at least one feed conveyors including at least one section independently driven by individual motors with an independent speed controller; at least one singulator downstream of the receiving conveyor; a first video camera monitoring a selected areas of the receiving conveyor providing a field of view to determine a receiving conveyor occupancy percentage (RCO %); a second video camera monitoring a selected areas of the feed conveyor providing a field of view to determine a feeding conveyor occupancy percentage (FCO %); a control program within the video computer capable of controlling a rate of receiving conveyor speed of the receiving conveyor and a rate of feed speed of the feed conveyor based on a calculated amount of free space area available on a given receiving section compared to an area of a package conveyed on the feed conveyor; the feed speed is calculated and controlled based on digital camera data to measure the available area on the receiving conveyor; the receiver conveyor speed is calculated and controlled based on digital camera data to measure the available area on the singulator; the feed speed and the receiving conveyor speed controlled to achieve a desired conveyor area utilization on a selected down stream conveyor according to the formula V2 (conveyor velocity of incoming items from feed conveyor)=V1 (conveyor velocity outgoing items on receiver conveyor)×2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density); and the singulator comprising a conveyor mechanism for conveying single-file articles in a forward direction while removing articles traveling laterally adjacent the single-file articles, the conveyor mechanism comprising first and second driven conveyor structures respectively forming first and second conveying lanes disposed in parallel as viewed in plan and situated immediately adjacent one another; the first and second conveying lanes applying first and second conveying forces, respectively, which are divergent relative to one another; the first conveying force including a forward directional component; the second conveying force including a lateral directional component extending away from the first lane to move articles away from the first lane that are out of contact with the first lane.

It is an object of this invention to provide a video based conveyor package management system which includes video cameras which monitor the packages at the merge areas of the infeed conveyors, all along the collector conveyor, the singulator conveyor and the sorter, identifying areas of low density and controlling the activation and speed of selected conveyors to increase the density of items of a given area of a conveyor.

It is an object of this invention to provide a video based conveyor package management system to utilize an algorithm and software in a computer for computing the open or unused area on the conveyors by comparing the area covered by packages on conveyors to the open area based on a pixel by pixel analysis of the information coming from each of the video cameras monitoring the conveyors.

It is an object of this invention to provide a video based conveyor package management system wherein the video cameras are interfaced with a computer which assembles the data from the cameras and outputs speed signals for selected feed conveyors in the system to fill in the large spaces on the collector conveyor with parcels to achieve a selected density of a particular area at 60% or greater.

It is an object of this invention to provide a video based conveyor package management system which determines the percentage of surface area of the collector conveyor, singulator conveyor, and other conveyors which is covered by packages, parcels, bags, envelopes, boxes, or other articles.

It is an object of this invention to provide a video based conveyor package management system which counts and identify the number of items contained on a conveyor.

It is an object of this invention to provide a video based conveyor package management system to identify, located, or identify a package, parcel, or other item on the conveyor by its digital image or footprint.

It is an object of this invention to provide a video based conveyor package management system which regulates input flow to a conveyor system where a camera is placed at each source of input to a collector conveyor, allowing control of the speed of each input conveyor with respect to the speed of the collector conveyor to the maximize the flow of packages through the system.

It is an object of this invention to provide a video based conveyor package management system which forces via friction, skewed rollers, belts, or incline planes, packages to one side of a collector conveyor and causes subsequent infeed conveyors to add packages to the open area beside those packages already present on the collector conveyor.

It is an object of this invention to provide a video based conveyor package management system which recognizes the number of objects, the average size of the objects, and the area utilization of a conveyor.

It is an object of this invention to provide a vision based system used to determine the percentage surface area coverage of a singulator device.

It is an object of this invention to provide a vision based system used to count the number of items contained on a conveyor.

It is an object of this invention to provide a vision based system used to regulate input flow to a conveyor system, where a camera is placed at each source of input flow, allowing control of each input, in respect of the maximum allowable input flow to the system.

It is an object of this invention to provide a vision based system to recognize the number of objects, average size of the objects, and area utilization of a conveyor.

It is an object of this invention to provide a vision flow management control system based on area utilization controlled by video flow.

It is an object of this invention to provide a camera based system that determines fullness of a conveyor system accumulation area, and also, more specifically, for fullness of a parcel singulator.

It is an object of the present invention optimize to cover maximum amount of surface of singulator.

It is an object of the present invention to provide a vision based flow management system that includes a camera and computer processor and interface to define and control and integrate with a conveyor control system via Ethernet, WIFI, bluetooth, and other smart electronic devices such as phones, tablets, laptop computers and other visual aid computer based devices capable of communicating with a computer system.

The present invention includes a novel method of managing bulk parcel flow with a vision management system, comprising or consisting of the steps of selecting a transition zone between a feed conveyor and a receiving conveyor each one having independent drive motors; selecting a camera field of view of the selected transition zone; addressing an IP address to each camera; setting an inline feeding conveyor speed to achieve a desired conveyor area utilization on a down stream receiving conveyor according to the formula V2 (conveyor velocity of incoming items from feed conveyor)=V1 (conveyor velocity outgoing items on receiver conveyor)×2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density); selecting a percentage of camera field of view; selecting a percentage of the feeding conveyor occupancy defined zone; selecting a percentage of the receiving conveyor occupancy defined zone; selecting a percentage of the desired occupancy after the merger; feeding parcels to the receiving conveyor occupancy defined zone; conveying parcels toward a desired occupancy zone at a selected position; and merging the parcels at a transition section between the feeding conveyor and the receiving conveyor.

Other objects, features, and advantages of the invention will be apparent with the following detailed description taken in conjunction with the accompanying drawings.

BRIEF DESCRIPTION OF THE DRAWINGS

A better understanding of the present invention will be had upon reference to the following description in conjunction with the accompanying drawings in which like numerals refer to like parts throughout the views wherein:

FIG. 17 is a plan view of a conveying system with a singulator according to the present invention;

FIG. 18 is a sectional view taken in the direction of arrows 3-3 of FIG. 17;

FIG. 19 is a top view of a removal conveyor of the present invention comprising a singulator and take off chute;

FIG. 20 is a top plan view of the singulator conveyor showing a first conveying surface having an inner row of offset low friction conveyor rollers angled to bias parcels forward and laterally away from an inner wall having a high friction conveyor extending there along, a second conveying surface having a row of central low friction offset conveyor rollers moving parcels forward and laterally toward the inner wall conveyor disposed parallel thereto, and a high friction conveying surface comprising a belt disposed parallel and in alignment with on the outside edge of the second conveying surface;

FIG. 25 is a schematic top plan view of a singulator conveying system utilized in combination with the vision flow singulator management system depicting packages being conveyed through the system; and FIG. 26 is an end elevational view depicting the relationship between three conveying lanes of a removal conveyor utilizing a high friction belt on the inside conveying surface.

DESCRIPTION OF THE PREFERRED EMBODIMENTS

Figure 1:
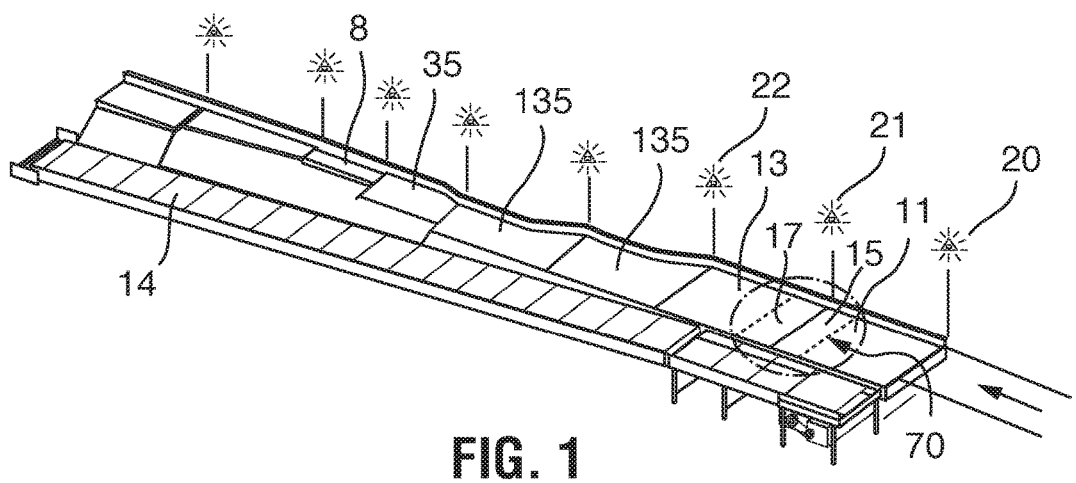
FIG. 1 is a top view of a video based conveyor package management system of the present invention showing the camera field of view of the vision based bulk parcel flow management system where the inline conveyor speed is set to achieve a desired conveyor area utilization on a down stream conveyor including the percentage of camera field of view, the percentage of the feeding conveyor occupancy defined zone, the percentage of the receiving conveyor occupancy defined zone, and the percentage of the desired occupancy after the merger.

In accordance with the present invention, there is provided a vision based bulk parcel flow management system.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of ±10%.

As used herein, the term "parcel" includes articles, envelopes, mail, packages, bags, drums, boxes, or irregular shaped items or conveyed containers.

As used herein the term "camera" includes one or more imaging devices including a camera, video camera, scanner, laser, or other pixel detecting and/or digital imaging devices (collectively referred to as cameras).

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
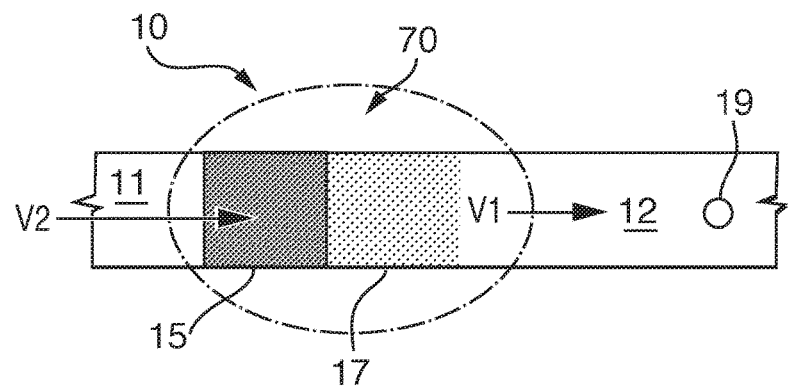
FIG. 2 is a perspective view of a section of a conveyor system as applied o a linear parcel singulator showing the feed conveyors and receiving conveyors and singulator wherein the roller and belt conveyors utilize independent motors to convey, arrange, and separate parcels and that the principle of the conveyor area utilization, and parcel count utilizing a system with cameras positioned at flow entry points of selected conveyors can be controlled to efficiently feed a singulator or other sorting device.

As shown in FIGS. 1-2, the conveyor system section 10 includes a plurality of conveyor modules or sections with belts and/or conveyor rollers for transporting and separating articles such as envelopes, mail, parcels, packages, bags, drums, boxes, or irregular shaped items thereon. As shown, a linear parcel singulator 8 and recirculating conveyor 14 are in flow communication therewith. A plurality of cameras provide a filed of view of selected occupancy defined zones such as the transition area 70 or transition point of merger of articles from one conveyor to another. Independent motors drive the conveyor modules or sections creating zones that can be accessed for a particular camera via the assigned IP address.

At least one camera, video camera or other pixel detecting and/or digital imaging devices is positioned at each individual input point, with a control algorithm to recognize incoming flow density, in terms of both belt utilization and throughput rate. These measures can be used to make changes to reduce parcel input flow, and could require stoppage of the feed line, if flow is too dense. Similarly, absence of flow could be recognized prompting an increase in speed of the input conveyor.

Cameras positioned to view the singulator surface are used in a similar matter to assess the buffer capacity utilization, primarily based on area coverage recognition. This feedback is used to dynamically adapt behavior of in-feed lines. The use of web cams provides added benefits in terms of system control room visibility. Variations in parameters used to tune the system can be evaluated in a more efficient manner. Jams and other system problems are better recognized.

In one preferred embodiment, a video camera and computer based conveyor package management system includes video cameras monitoring the number and size of the packages present on the infeed conveyors, collector conveyor, singulator conveyor and/or sorting conveyor in a package handling system wherein the camera data is used to measure the available area or space or volume on the conveyors to maintain a desired density of packages on selected conveyor(s). The conveyor speed is controlled as a function of occupancy on a collector or just prior to a singulator. The computer feeds the information to the conveyor speed controllers to introduce packages from one or more feed conveyors to a collection conveyor wherein packages are detected by one or more cameras and the speed of selected conveyors and/or the velocity of the packages or articles is controlled for arrangement of the packages at optimal spacing maximizing the density or volume of the packages on a given conveyor area and throughput of the system and accordingly minimizing the number of conveyors required for the system. When the computer determines there is a enough space on one of the conveyor belts, for example, the collector belt, the computer tells the controller to add a package or packages by causing an infeed belt to add a package or packages to the space or vacant area on the collector belt.

It is contemplated that a line-scan camera having a single row of pixel sensors can be utilized in the instant invention. The lines are continuously fed to a programmable controller, programmable logic controller (PLC), or a computer that joins them to each other and makes an image. Multiple rows of sensors may be used to make colored images, or to increase sensitivity by TDI (Time delay and integration). Traditionally maintaining consistent light over large 2D areas is quite difficult and industrial applications often require a wide field of view. Use of a line scan camera provides even illumination across the "line" currently being viewed by the camera. This makes possible sharp pictures of objects that pass the camera at high speed and be used as industrial instruments for analyzing fast processes. It is contemplated that a 3D camera system utilizing one or more cameras or other pixel detecting and/or digital imaging devices may also be used to detect the height of the packages and determine volume density.

The camera based vision system recognizes and maximizes belt area utilization of the feed conveyor. A plurality of cameras can be positioned at selected points of the feed conveyor and the receiving end of the receiving conveyors. A computer with a control algorithm recognizes individual items area, foot print of the items and the rate at which individual objects are passing, and the area utilization of the feed conveyor. The video camera and computer based conveyor package management system monitor and control the speed of the feed conveyor based on the number and size of the packages present on the feed conveyor. Information from the receiving conveyor and collector conveyor or singulator conveyor and/or sorting conveyor in a package handling system may also be utilized wherein the camera data is used to measure the available area or space or volume on the conveyors to maintain a desired density of packages on selected conveyor(s). The conveyor speed is controlled as a function of occupancy on a collector or just prior to a slide sorter conveyor, singulator, or receiver conveyor.

The vision based bulk parcel flow management system 5 comprises or consists of a section 10 of a vision based conveyor system wherein a plurality of cameras 20 detect parcels upon the primary or main conveyor collector conveyor which incorporate at least one feed conveyor 11 and one receiving conveyor 13 used in conjunction with a singulator 8, hold-and-release conveyor, accumulator, and/or strip conveyor typically downstream from the feed conveyor 11 which are shown in linear alignment with a singulator 8. The conveyors utilize roller and/or belts and each unit is powered by at least one independent motor to convey, arrange, and separate parcels at selected rates activation or of speed based upon desired occupancy of one or more selected conveyors. Thus, the degree of occupancy can be controlled on each conveyor independently of an adjacent conveyor upstream or downstream and the plurality of conveyors in the conveying system can be started, stopped, or the speed can be increased or decreased in order to increase the area of occupancy for a particular conveyor. The conveyor system section 10 utilizes independent motor driven conveyor zones.

The conveyor system section 10 includes at least one feed conveyor 11 and a downstream receiving conveyor 13. The selected inline feed conveyor speed is set to achieve a desired conveyor area utilization on the selected down stream receiving conveyor 13 according to the formula V2 (conveyor velocity of incoming items from feed conveyor)=V1 (conveyor velocity outgoing items on receiver conveyor)×2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density). A camera 21 is utilized to present a field of view of the feed conveyor occupancy zone 15 established for a given velocity V2 of parcels fed to the receiving conveyor occupancy defined zone 17 as the parcels are conveyed toward a concentrated desired occupancy zone 19 at a selected position after the transition section, zone, or point 70 where the feed conveyor 11 and receiving conveyor 13 merge.

Figure 3:
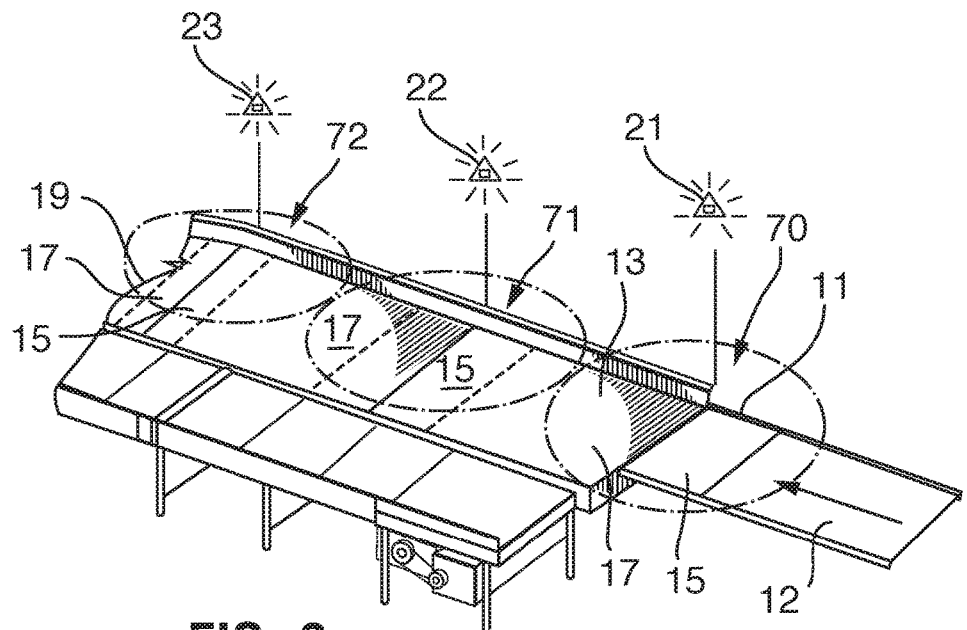
FIG. 3 shows the camera field of view of the transition section of a feed conveyor and receiving conveyor wherein each one of a plurality of cameras provide a field of view to define a feeding conveyor occupancy zone, and receiving conveyor occupancy defined zone at the transition point of merger of the upstream and downstream conveyors.

More particularly, as shown in FIG. 3, a plurality of cameras are shown focusing upon the selected transition section 70 of the conveying system section 10. The camera 21 is focused upon the feeding conveyer occupancy defined zone 15 and receiving conveyer occupancy defined zone 17 providing a field of view at a portion of the conveying system where the parcels move from the feed conveyor 11 such as a collecting conveyor 12 or other downstream conveyor to the receiving conveyor 13. Downstream cameras 22 and 23 focus on downstream occupancy zones at other transition points 72 and 73 respectively within the conveyor system 5. The rate of speed of individual conveyors is set to achieve a desired conveyor area utilization in a concentrated desired occupancy zone. Thus, V2 (conveyor velocity of incoming items from feed conveyor)=V1 (conveyor velocity outgoing items on receiver conveyor)×2× (DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density).

Figure 4:
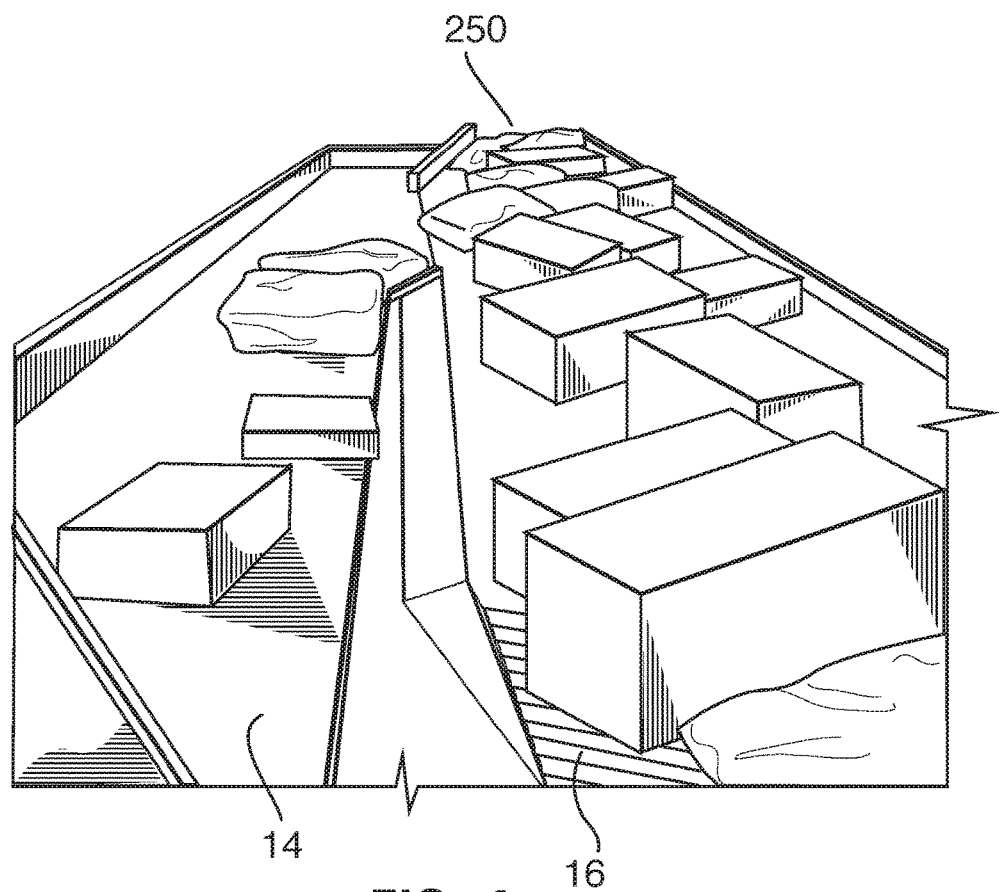
FIG. 4 is a perspective view of a field of vision of both a skewed roller section of the conveyor and a belt section of the parallel and adjacent recirculating belt.

A camera 20 is capable of measuring the occupancy over more than one zone. As illustrated in FIG. 4, occupancy of both the a skewed roller section 16 of the conveyor is measured as well as a recirculating belt section 14.

Figure 5:
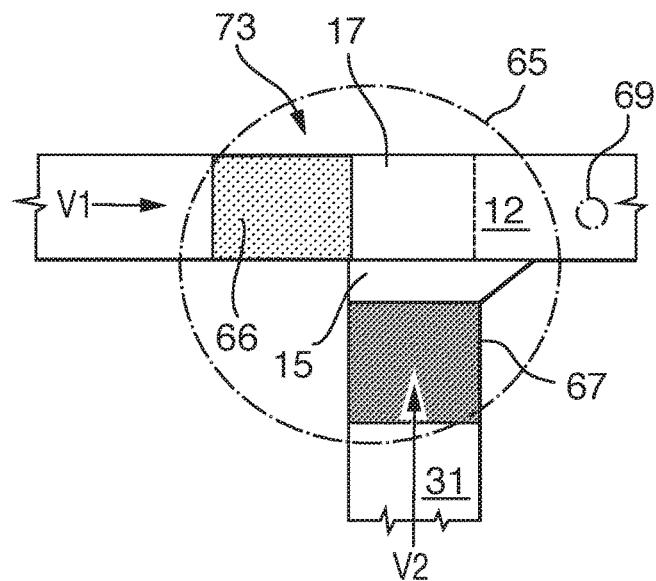
FIG. 5 is a top view showing the merger of a side transfer feed conveyor with an intersecting collector conveyor wherein the rate of speed of the conveyors is set to achieve a desired conveyor area utilization on the downstream portion of the collector conveyor, based on a camera field ov view of the intersection based on the receiving conveyor occupancy defined zone, feeding conveyor occupancy defined zone and the desired occupancy after the merger.

FIG. 5 illustrates a side transfer feed conveyor 31 conveying article 66 intersects the flow through collection conveyor 12 at a 90 degree angle. Of course, the intersect angle is a matter of choice and may at any angle up to 90 degrees. The side feed conveyor 31 is shown feeding an article 67 onto the receiving or collecting conveyor 12, wherein the speed of the side feeder conveyor 31 is controlled to achieve desired conveyor area utilization on the receiving collection conveyor 12. The speed of the conveyors 12 and 31 is determined by the camera field of view 65 which includes both the feeding conveyor occupancy defined zone 15 and the receiving collector conveyor occupancy defined zone 17 prior to merging of the conveyors at transition point 73 wherein the desired occupancy zone 19 after the merger has an increased density in the selected area after the merge of the articles. The rate of speed of individual conveyors is set to achieve a desired conveyor area utilization in a concentrated desired occupancy zone as determined by the formula V2 (conveyor velocity of incoming items from feed conveyor)=V1 (conveyor velocity outgoing items on receiver conveyor)×2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density).

Figure 6:
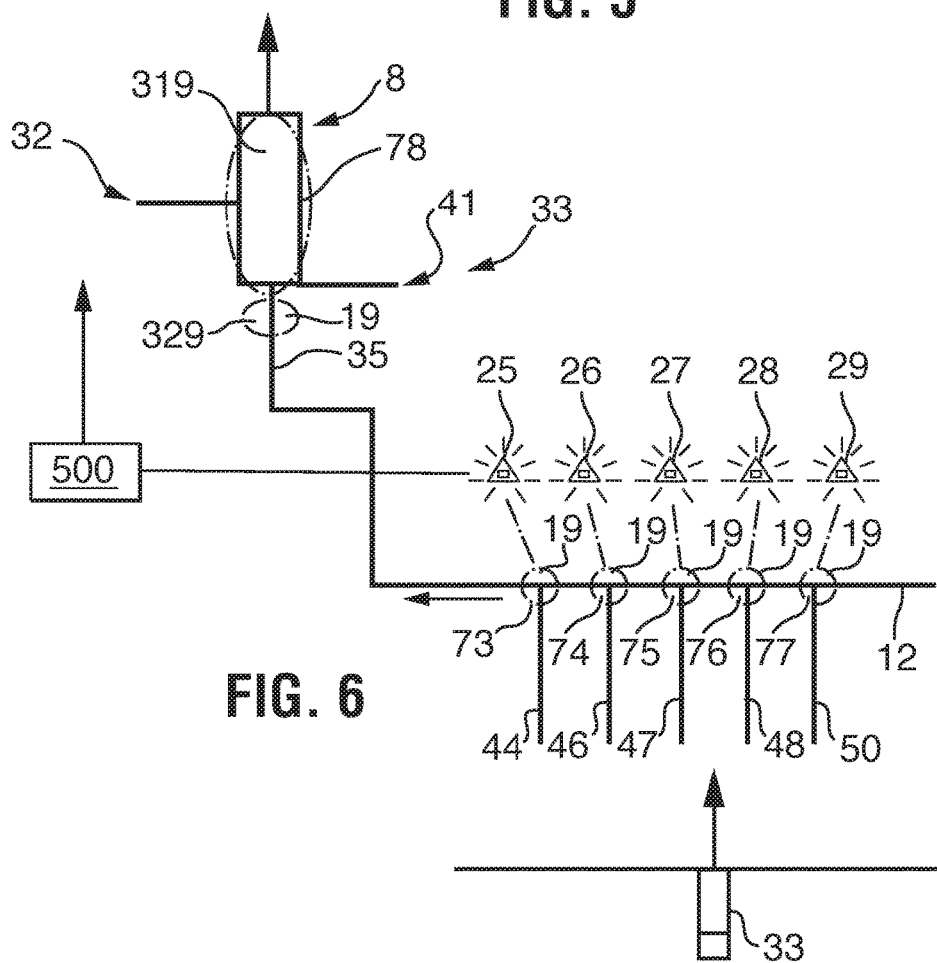
FIG. 6 is a schematic showing the vision based bulk parcel flow management system applied to a bulk feed system from the trailer dock to the sorter including a control system regulating a plurality of individual inputs based on the conveyor fullness at various positions and the singulator fullness wherein the conveyor speeds are regulated as a function of singulator fullness and incoming occupancy just prior to singulator.

The vision based bulk parcel flow management system 5 is applicable to a bulk feed system from the point of unloading of articles from trailers onto induction conveyors through the separation and sorting process. As shown in FIG. 6, articles unloaded from a truck 33 are off loaded from any one of a plurality of unloading induction conveyors 44, 46, 47, 48, and 50 whereby the rate of speed of the conveyors 44, 46, 47, 48, and 50 and the collection conveyor 12 are regulated by cameras 26, 27, 28, and 29 providing a camera field of view at the merger or respective transition points 73, 74, 75, 76, and 77 of the induction feed conveyors 44, 46, 47, 48, and 50 and a collector conveyor 12. The collector belt 12 may be devoted to off-loading induction conveyors or flow from other sources such as a recirculating conveyor 14 from a sorter area due to output lanes which are full. The induction feed conveyor(s) 44, 46, 47, 48, and 50 are regulated as a function of collector conveyor 12 speed and percent of occupancy of articles on the collector conveyor 12. An accumulating conveyor or accumulator 35 may be positioned up stream of the singulator 8 and down stream from the collector conveyor 12 and utilized as a receiving conveyor. The movement of the feed and/or collector conveyors may be regulated as a function of the accumulator conveyor 35 just prior to the singulator and is based on the area of the conveyor occupied with packages in order to provide a smooth feed to the singulator 8. A downstream singulator 8 includes a singulator camera 32 providing a field of view 319 of articles on the singulator 8 and a camera 41 providing a field of view 329 of the articles merging at transition point 78 with the singulator 8 fed from the adjacent accumulator conveyor 35.

A computer or microprocessor control system 500 controlling the vision based bulk parcel flow management system regulates a plurality of individual inputs based on the singulator fullness. The conveyor speeds of the feed conveyors 11, induction conveyors 44, 46, 47, 48, and 50, collector conveyors 12, recirculating conveyor 14, singulator 8, and accumulator 35 are controlled and regulated as a function of the singulator fullness and incoming percent occupancy. The inline conveyor speed is set to achieve a desired conveyor area utilization on the down stream conveyor according to the formula V2 (conveyor velocity of incoming items from feed conveyor)=V1 (conveyor velocity outgoing items on receiver conveyor)×2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density).

The vision control system includes a plurality of smart camera modules 20 capable of processing video images and determine the percent of occupancy within defined zones which can be adjusted for each camera by zooming in or out or by selecting a particular grid or area on a smart device video screen to determine the optimum conveyor speed. The smart camera modules process video images and determine occupancy percentage within the defined zones. A camera IP address is designated for each camera 20. For instance, the camera can be programmed or set up so that a simple "right click" defines the camera IP address. An ethernet system provides means for transmitting a signal to a computer via a command PC, PLDC, or VLC control system for calculating percent of occupancy information and calculating the desired conveyor speeds. Interface is accomplished via smart phone, tablet, laptop, smart watch, stand alone terminal and/or network. The configuration software provides a convenient interface to configure control zones and input control parameters. Individual camera IP addresses are assigned to each camera in the vision system.

Figure 7:
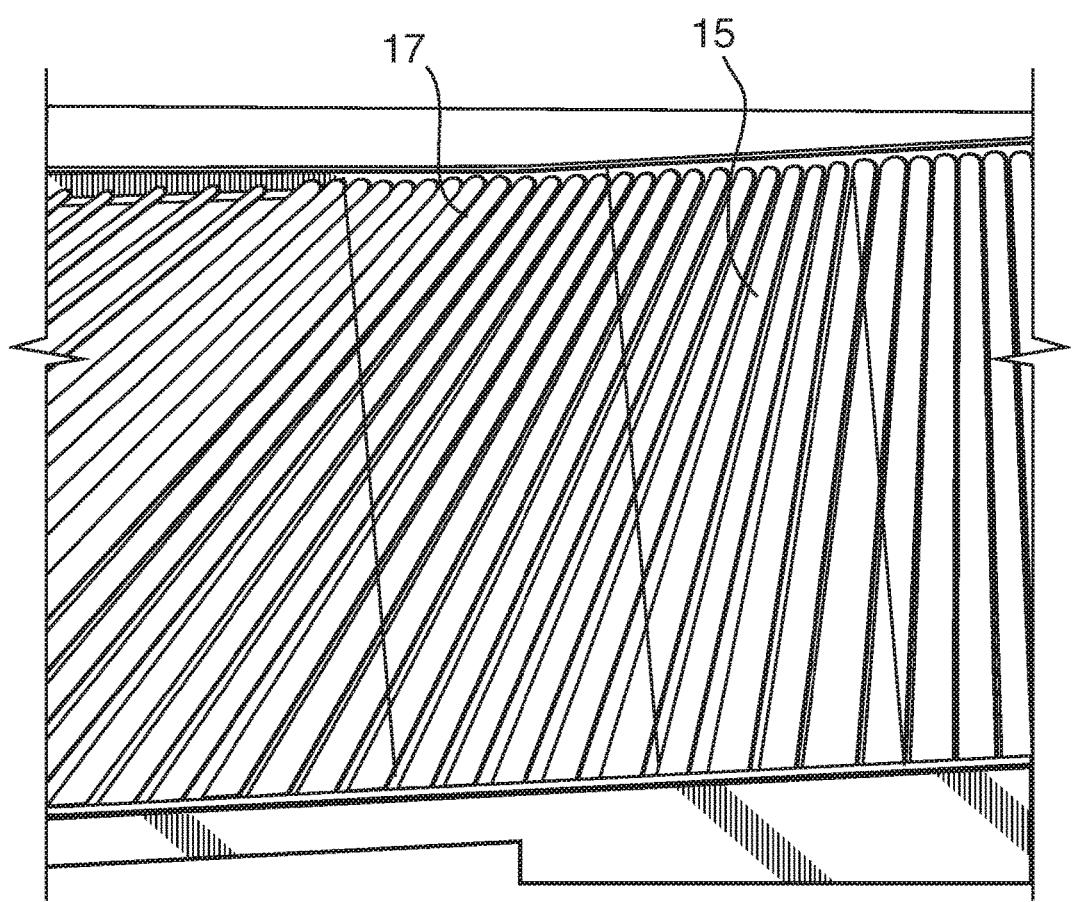
FIG. 7 shows an oversight configuration window showing the receiving conveyor occupancy zone and feeding conveyor occupancy zone, each one of which can be resized and dragged together or independently moved to a different position or overlapped.

The vision based bulk parcel flow management system includes means to open a configuration window to define "oversight" parameter and define zones where occupancy is to be measured at any time for any camera occupancy defined zone. FIG. 7 shows an oversight configuration window showing the receiving conveyor occupancy zone and feeding conveyor occupancy zone, each one of which can be resized and dragged together or independently moved to a different position or overlapping. A camera for a particular transition point is selected and is utilized to present a field of view of a feed conveyor occupancy zone 15 and the receiving conveyor occupancy zone 17 to determine the conveyor area utilization and article count. The occupancy zone 15 of the feed conveyor can be resized in accordance with the parameter selected on the computer, smart phone or tablet screen by simply adjusting the size of the area on the screen. Furthermore, the receiving conveyor occupancy zone can be dragged and resized in the same manner. The occupancy rate will be calculated upon the selected areas accordingly to achieve the highest density of articles on the conveyor.

The camera is utilized to present a field of view of the feed conveyor occupancy zone 15 established for a given velocity V2 of articles fed to the singulator conveyor pursuant to the occupancy defined in zone 17 which is typically at a transition point but can be any region or zone of a selected conveyor or article processing site. The camera based vision system 5 recognizes the belt area utilization and article count. The vision system cameras 20 are usually positioned at flow entry points of the collector conveyor(s) 12 and at the singulator 8. The control algorithm requires recognition of individual items and the rate at which individual objects are passing, and the area utilization of the collector belt. Average article size and shape can be considered as well. The video camera and computer based conveyor package management system includes video cameras monitoring the number and size of the packages present on the infeed conveyors, collector conveyor, singulator conveyor and sorting conveyor in a package handling system wherein the camera data is used to measure the available area or space on the conveyors to maintain a desired density of packages on selected conveyor(s). It is even possible to trace and/or trace individual articles by their labels, code, or physical characteristics from the receipt of the article from the unloading truck and unloading dock to the point of the distribution vehicle.

Example 1

Figure 8:
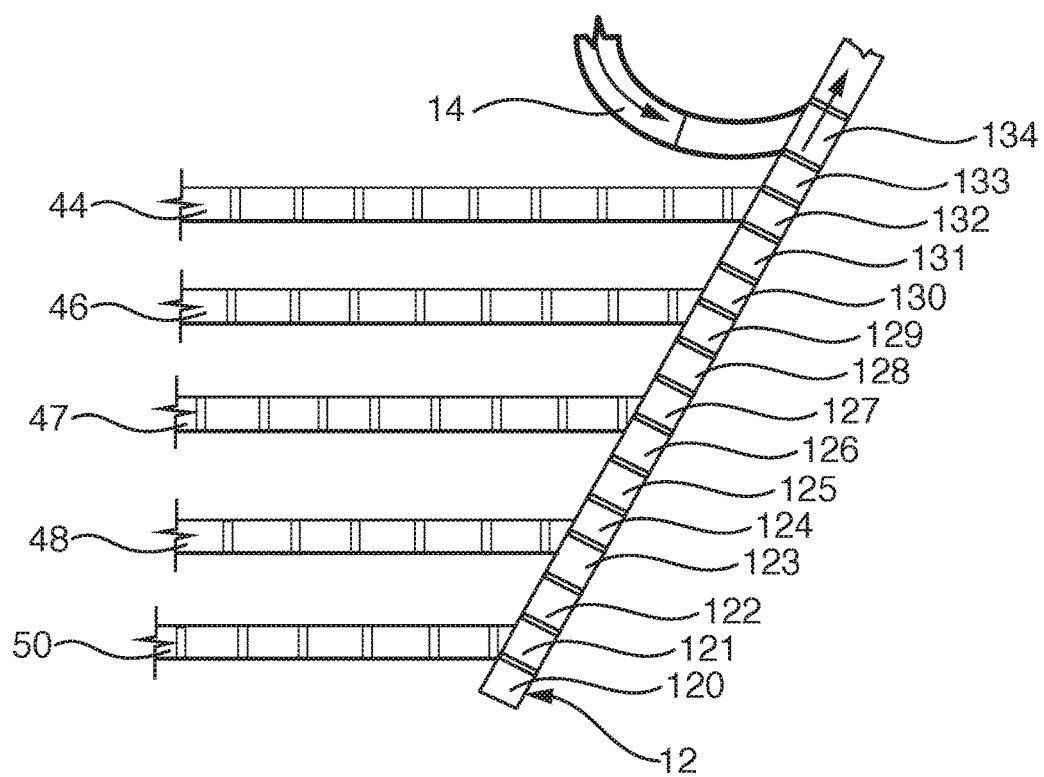
FIG. 8 is an overhead view showing the vision based bulk parcel flow management system from the trailer unloading feed conveyors through the singulator and including a recirculating loop.

As shown in FIG. 8 packages are off loaded from a cargo carrier onto a selected induction feed conveyor 44, 46, 47, 48, and 50 in flow communication with a collector conveyor 12 composed of modular units of sections of conveyor 120-134. For example, induction feed conveyor 50 intersects with and feeds articles onto collector conveyor section 121, induction feed conveyor 48 intersects with and feeds articles onto collector conveyor section 124, induction feed conveyor 47 intersects with and feeds articles onto collector conveyor section 127, feed conveyor 46 intersects with and feeds articles onto conveyor section 129, and feed conveyor 44 intersects with and feeds articles onto collector conveyor section 132. The recycling or recirculating conveyor 14 intersects with and feeds into conveyor section 134.

Figure 9:
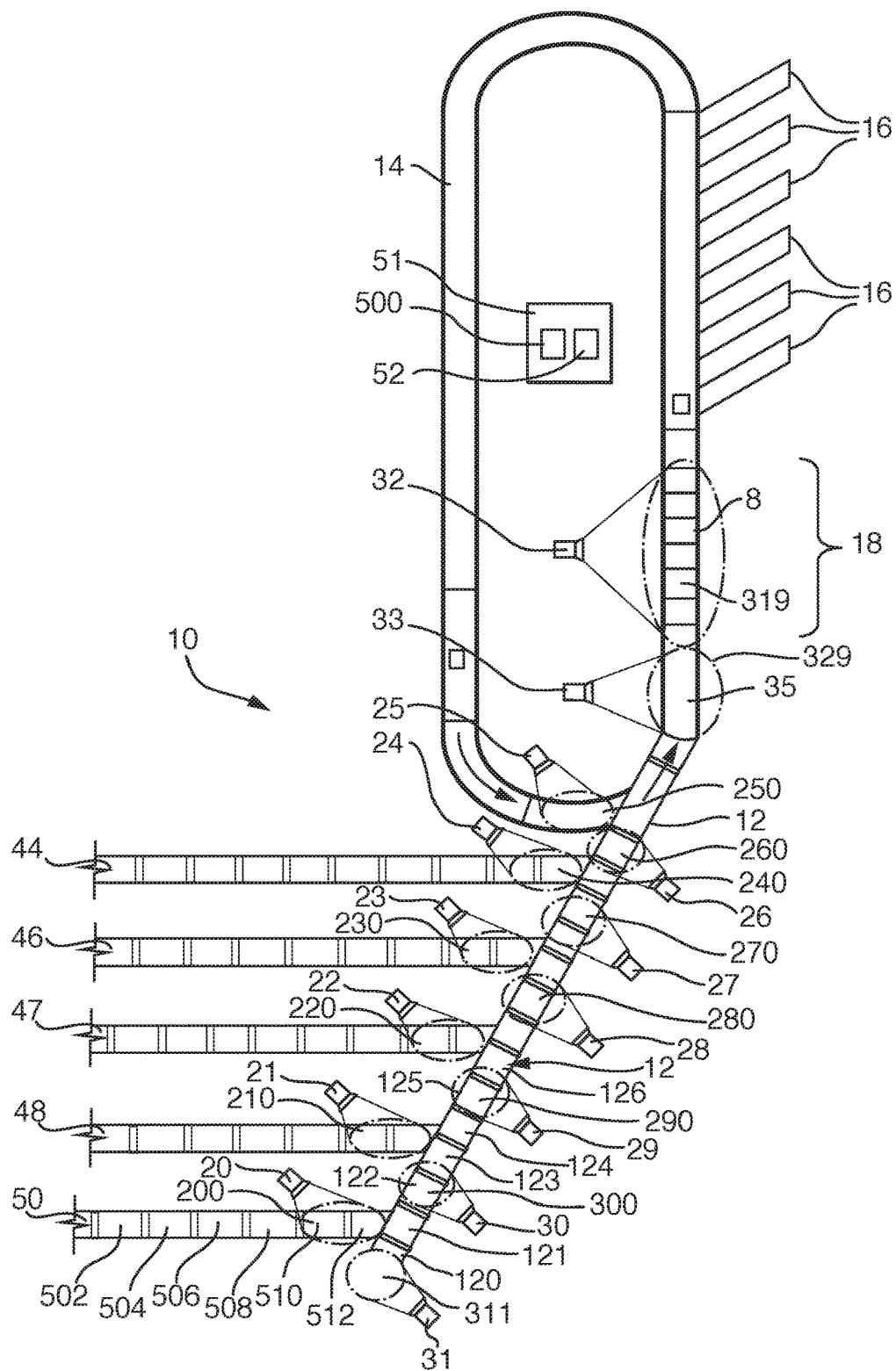
FIG. 9 shows the feed conveyors merging with the collector conveyor comprising modular sections.
Figure 10:
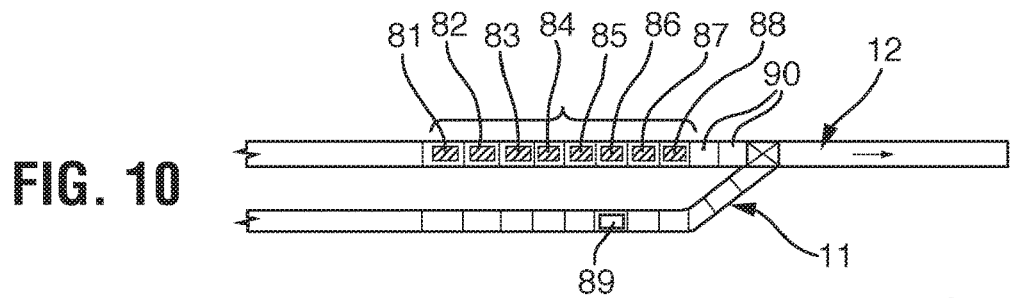
FIG. 10 is a top view showing a package progressing forward on a feed conveyor parallel to a collector conveyor.
Figure 11:
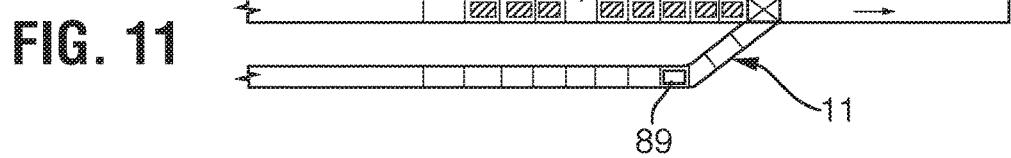
FIG. 11 is a top view showing a package progressing forward on a feed conveyor parallel to a collector conveyor, wherein a section of the collector conveyor is controlled to allow a space for receiving an article conveyed by the feed conveyor.
Figure 12:
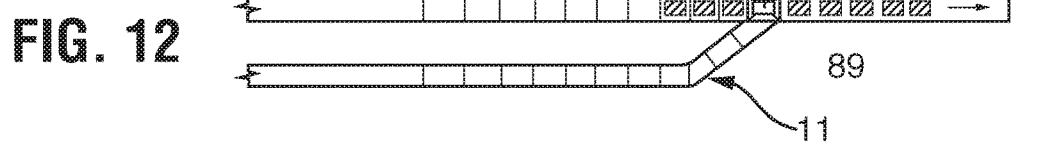
FIG. 12 is a top view showing a package progressing forward on a feed conveyor parallel to a collector conveyor, wherein an article conveyed by the feed conveyor is disposed into a receiving section of the collector conveyor.
Figure 13:
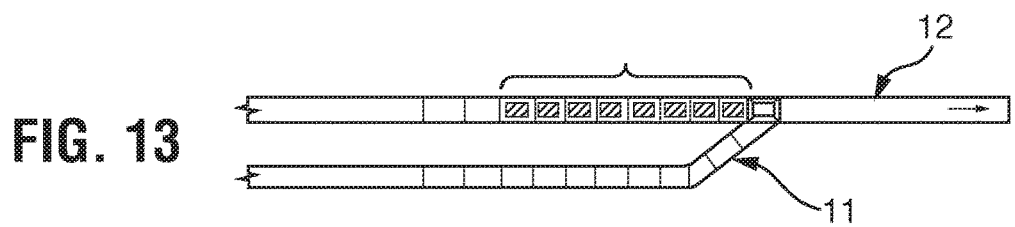
FIG. 13 is a top view showing a package progressing forward on a feed conveyor parallel to a collector conveyor, wherein an article conveyed by the feed conveyor is fed into a position preceding a plurality of articles conveyed on the collector conveyor.

In accordance with FIG. 9, the collecting conveyor 12 starts at the first feed conveyor 50 and extending to an accumulator 35 and/or singulator 8 intersecting a selected number of inductor feed conveyors 44, 46, 47, 48, and 50. The recycle conveyor 14 also feeds articles onto the accumulator 35 or other conveyor intersecting with the collecting conveyor 12 prior to the singulator conveyor 8. The inductor feed conveyors include a selected number of modules or sections. For examples as shown sections 502, 504, 506, 508, 510, and 512 are sections of the inductor feed conveyors which include at least one transition point wherein the selected inductor feed conveyor speed is set to achieve a desired conveyor area utilization on the selected down stream receiving conveyor 13 according to the formula V2 (conveyor velocity of incoming items from feed conveyor)=V1 (conveyor velocity outgoing items on receiver conveyor)×2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density). Cameras 20, 21, 22, 23, and 24 are utilized to present a field of view of the inductor feed conveyor occupancy zone 15 established for a given velocity V2 of parcels fed to the receiving conveyor occupancy defined zone 17 as the parcels are conveyed toward a concentrated desired occupancy zone 19 at a selected position after the transition section, zone, or point 200, 210, 220, 230, and 240 respectively, where the inductor feed conveyor and receiving collector conveyor 12 merge. Feed conveyors 44, 46, 47, 48, and 50 also include modules or conveyor sections having designated motors which operate independently to decrease or increase the density of the articles on a collection conveyor 12.

Figure 14:
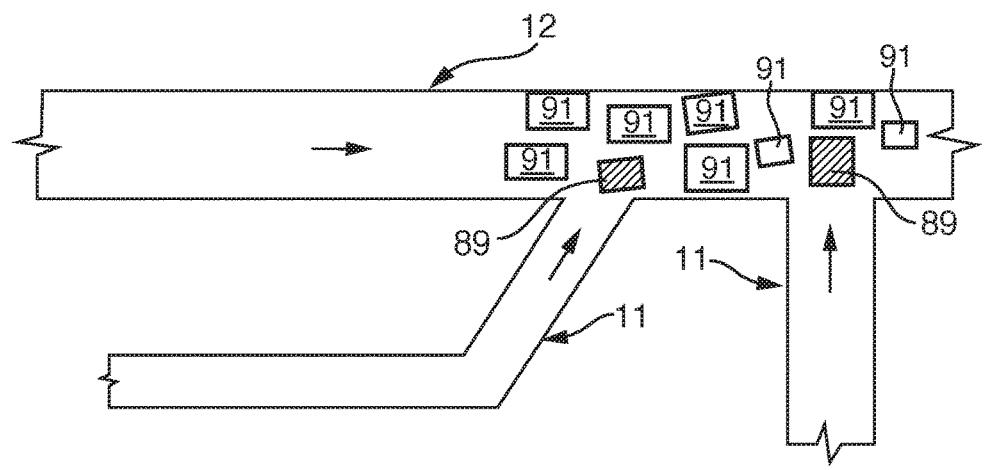
FIG. 14 is a top view showing a plurality of packages progressing forward on a collector conveyor, wherein a angled feed conveyor and side feed conveyor are controlled for insertion of a package into a vacant area of the collector conveyor.

Each of the conveyors or sections of a conveyor are driven by a separate variable speed motor. This allows speeding up and slowing down of the individual sections of conveyor 50 to allow packages to be spaced out or concentrated in a given area in a desirable way depending upon the optimum flow rate for processing by the accumulator 35 or singulator 8. For instance, when a large gap 90 is detected between two particular packages, the rate of speed of the sections of conveyor between the packages are increased in order to close the gap between the packages. As best shown in FIGS. 10-13, articles on a feed conveyor intersects with a collector conveyor to illustrate sequentially how a package 89 is inserted from a feed conveyor 11 onto a receiving/collecting conveyor 12 containing a plurality of packages 81-88 inserting a package 89 into a gap 90 between other packages on the moving collector conveyor 12. As illustrated in FIG. 14, a plurality of packages 91 are conveyed on a collector conveyor 12. A angled feed conveyor 92 and a perpendicular side feed conveyor 93 each carrying a parcel 89 intersects with the collector conveyor 12 whereby the speed of both of the feed conveyors 92 and 93 are controlled to insert the parcel 89 into gaps formed between the preexisting parcels 91 on the collector conveyor 12.

The vision based bulk parcel flow management system includes a plurality of feed conveyors induction feed conveyors in line or angled at up to 90 degrees to the receiving conveyor, an optional recirculating conveyor 14, an optional accumulator, sorting lanes, and a a singulator conveyor 8. Video cameras monitor the feed conveyors just before they merge onto the collector belt 12 at their respective monitor areas 200-250. Another video camera 32 monitors the area 319 which includes the singulator conveyor 8. Cameras 26, 27, 28, 29, 30, and 32 monitor selected sections of conveyor 12 which lie before the areas where the infeed conveyors merge with the collector conveyor 12. Electrical cabinet 51 contains a video computer 500 which receives video input data from cameras 20-25 and 32. Electrical cabinet 52 contains speed controllers for the motors for all of the conveyors 44-50. The video computer is capable of counting individual packages and calculating the size "area" of packages as well based on information coming from the various cameras monitoring the conveyors.

Singulator conveyor 8 receives randomly dispersed packages and aligns them in single file with respect to the movement of the conveyor. An example of a singulator conveyor is described in U.S. Pat. No. 5,701,989 and PCT/US14/00200 filed on Oct. 21, 2014 and U.S. Ser. No. 14/121,829 filed on Oct. 21, 2014 all of which are incorporated by reference herein in its entirety.

The singulator conveyor 8 receives packages and articles such as bags or envelopes, parcels, boxes, luggage, mail, or other goods form the up stream conveyor 12. After the singulator conveyor 8, the individual packages are sorted and sent to a recirculating conveyor 14. The recirculating conveyor 14 conveys packages which have been removed during the alignment process back to a selected receiving conveyor collector conveyor 12 to be re-sorted on the singulator. The primary objective of the present invention is to keep the singulator conveyor 8 fully supplied with a steady flow of packages without jamming the packages accumulating on the collector conveyor 12 due to surges and slugs of packages received from up stream feed conveyors.

The singulator conveyor system is capable of handling random sized packages. Preferably, packages on the feed conveyors are single file; however, it is not uncommon for the packages to be irregularly spaced and oriented in random directions as they are off loaded from the trucks onto a selected feed conveyor 44, 46, 47, 48, and 50. The unloading usually occurs in slugs wherein a large volume of packages are off loaded in a short period of time.

For instance, as best illustrated in FIG. 9, camera 30 is monitors areas conveying the occupancy zones for conveyor sections 122 and 123. If the packages in the area are of a low density in occupancy zone area 210 as monitored by camera 21, the digital image data (pixels) is processed by the controller and vision computer controls conveyor 48 to start, stop, slow or increase feed rate of the packages onto a collector conveyor section 124.

The packages are conveyed down stream toward conveyor section 35 and are monitored via cameras 26, 27, 28, 29, 30, and 31 as the packages move through the transition sections between the conveyors and through subsequent camera occupancy zones, the computer program analyzes the overall loading of conveyor sections on a pixel by pixel basis. A package in a particular occupancy zone area is monitored by the camera and a digital image of the size of the foot print of the package is ascertained by the video computer 500. The computer determines if the maximize the area of the conveyor in accordance with the feed rate and downstream load. The video based package management system will utilize the area of the entire conveyor assembly to control the flow of packages to the singulator, separator, scanner or processing site. The conveyor speed is controlled as a function of occupancy on a collector or just prior to a singulator. The computer feeds the information to the conveyor speed controllers to introduce packages from one or more feed conveyors to a collection conveyor wherein packages are detected by one or more cameras. The speed of selected conveyors is controlled for arrangement of the packages at optimal spacing maximizing the density of the packages on a conveyor and throughput of the system and accordingly minimizing the number of conveyors required for the system. When the computer determines there is a enough space on one of the conveyor belts, for example, the collector belt 12, the computer signals the controller to add a package 89 or packages by causing a feed belt 11 to add the package 89 or packages to the space 90 or vacant area on the collector belt 12

Figure 15:
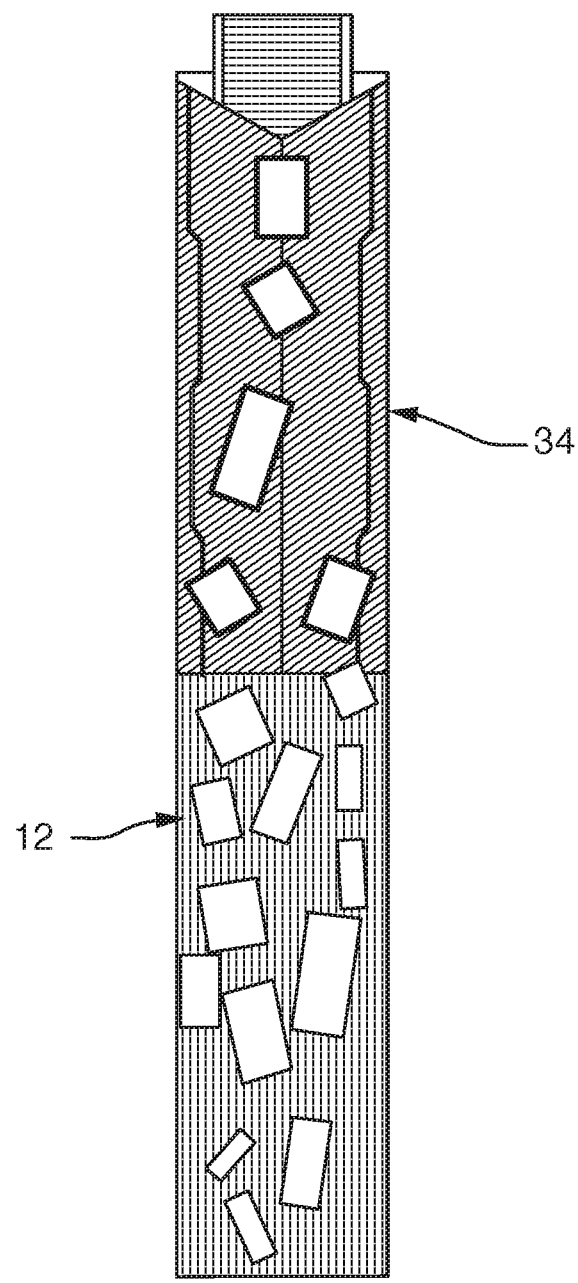
FIG. 15 is a top view showing conveyor package alignment using skewed rollers.
Figure 16:
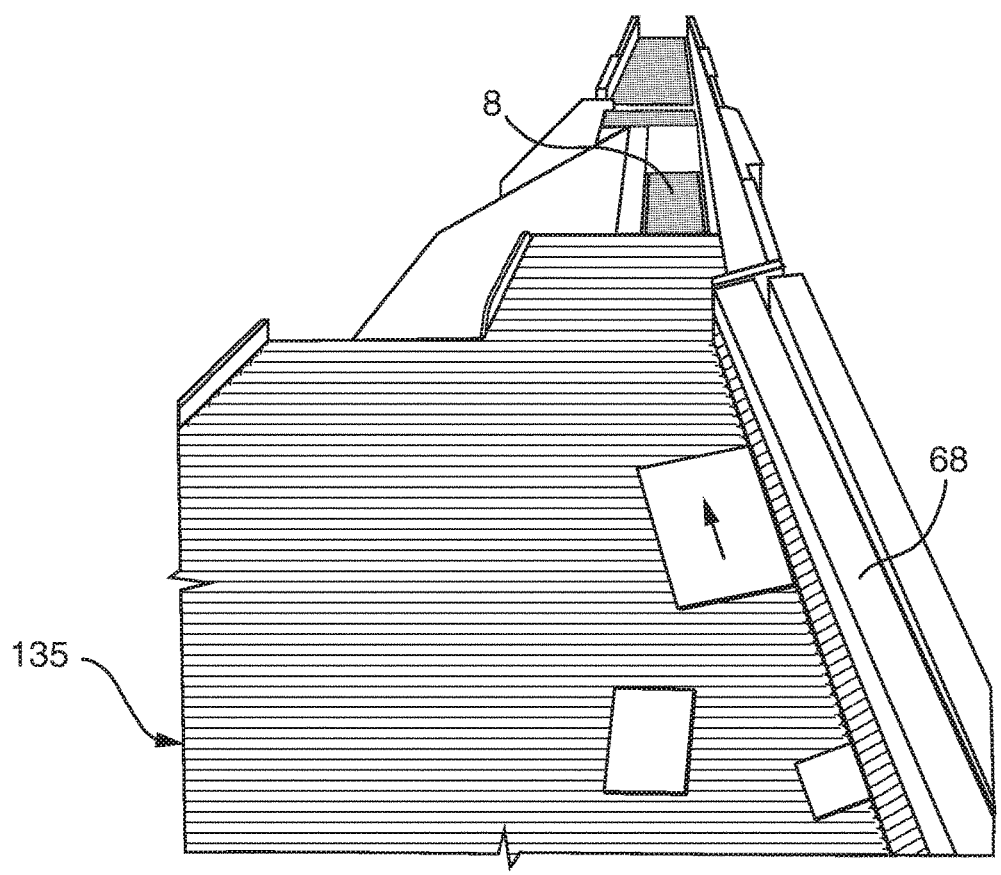
FIG. 16 is a perspective view of a conveyor using skewed rollers to urge packages against a side wall for aligning same.

As shown in FIGS. 14-16, the packages from the collector conveyor 12 are conveyed in staggered, spaced apart, and disoriented condition. The packages from the collector conveyor 12 are typically fed onto a downstream alignment conveyor 34 which may urge the packages into alignment in the center of a conveyor. In addition, selected sections of the conveyor system typically include skewed rollers or a combination of low and high friction belts to bias the packages in a particular direction separating the parcels into a single file. The skewed rollers urge the packages to a selected side of the conveyor 12 against an upward extending guide or wall 68.

When the density of the packages decreases at the transition zone between a feed conveyor and the collector conveyor 12, gaps are formed between packages resulting in increasing the rate of speed of a selected feed conveyor in order to maintain a desired flow rate of packages to the collector to maximize throughput of the singulator.

This control scheme gives priority any selected conveyor. For instance, priority may be given to the first feed conveyors at the beginning of the collector conveyor 12 where the collector conveyor 12 will tend to be empty or have a less dense loading. Therefore, packages on the first feed conveyors will typically have more free area. Selected sections of collector conveyor 12 can be slowed down or even stopped to allow the latter feed conveyors to unload, as may be desired. Moreover, the collector conveyor 12 may be slowed or stopped to force more packages from the feed conveyor to push additional articles onto the collector conveyor 12 so that the area of the collector conveyor is full.

The vision based package flow management control system 5 maximizes throughput of packages to a singulator conveyor and a sorting system, utilizing the greatest amount of area on the collector conveyor 12 or accumulator prior to the singulator 8. Other conveyors in the conveyor system are controlled based on the maximum capacity of the singulator determined at a constant rate of speed rather than an average of surge capacities. The increased efficiency enables the system to to minimize the number of conveyors required and the area, width, and/or length of the conveyors in the system to achieve a desired throughput at maximum efficiency.

The video computer 500 utilizes a plurality of cameras to monitor the occupancy zones of selected areas on the conveyors leading up to singulator or separation process. The computer compares the amount of free space on the selected conveyors and compares it to the the size of the package on the feed conveyor. If there is a adequate space, the feed conveyor will transfer the package. The amount of room required by a given package is determined by the programmer. For instance, the program may required that the amount of space on the collector conveyor is 1.5 or even 2 times the footprint of a given package depending on the orientation of the adjacent articles. Rate of speed changes of various conveyors are also controlled by the video computer to keep the singulator conveyor fully supplied. The video computer send speed control signals to the speed controllers of all the conveyor sections to regulate throughput of packages.

Example 2

The vision based package flow management control system can be utilized with a variety of sorting and alignment conveyors such as a singulator.

One preferred conveyor system according to the present invention is depicted schematically in top plan view in FIG. 17-26. Depicted therein is the downstream end of the singulator conveyor 310 which has skewed rollers 312 for advancing articles, such as packages, in a direction having a longitudinal forward component L and a lateral inward component L'. The packages are advanced forwardly while being arranged in single file against a vertical side wall 316.

It is necessary that side by side packages be removed in order to avoid the situation where two packages travel simultaneously to a scanner mechanism. In order to prevent such an occurrence, one embodiment of the present utilizes a removal conveyor 340 positioned between the singulator conveyor 310 and the flow control mechanism 320.

The removal conveyor comprises a vertical inner side wall 342 formed by a driven endless belt 343 which travels in the longitudinal forward direction L. A horizontal conveyor mechanism is provided which comprises a first or inner conveyor lane 344, a second or middle conveyor lane 346 and an optional third or outer conveyor lane 348, all arranged in parallel as viewed in plan. Each of those conveyor lanes comprises a row of rollers 354, 356, 358 driven by a conventional drive mechanism, e.g., motor-driven endless bands 352. The rollers 354, 356, 358 lie in a common horizontal plane.

Alternatively, the conveyor lanes could be comprised of belts, i.e., each conveyor lane could comprise a plurality of conveyor belts arranged in parallel and traveling in the intended direction of the respective lane. Thus, for example, the belts of the inner lane 44 would be inclined toward the belt 343, and the belts of the middle lane 346 would be inclined toward the outer lane. The outer lane 348 would comprise a single belt traveling the direction of arrow L.

The conveying lanes are designed so that each lane advances packages longitudinally forwardly, and furthermore so that: (I) the inner lane 344 applies a lateral inward force to the packages, (ii) the middle lane applies a lateral outward force to the packages, and (iii) the outer lane 348 applies no lateral outward force to the packages. (Preferably, the outer lane 348 applies no lateral force whatsoever to the packages.)

The rollers 354 of the inside lane are skewed such that their lateral outer ends 354 are situated forwardly of their lateral inner ends 354. Consequently, the inside lane 344 applies to packages a conveying force acting in a direction having the longitudinal forward component L and the lateral inward component L. Hence, packages advanced by the inner lane are also biased against the inner side wall 342. The rotary speed of the inner lane rollers is preferably selected in order to advance packages longitudinally forwardly at the same speed as the inner side wall 342.

The rollers 356 of the middle conveyor lane 46 are skewed such that their lateral inner ends 356 are disposed forwardly of their lateral outer ends 356'. Thus, the middle lane 346 applies to packages a conveying force acting in a direction having both the longitudinal forward component L and a lateral outward component L". Thus, the first and second lanes 344, 346 apply first and second conveying forces, respectively, which are mutually divergent.

The rollers 358 of the outer conveyor lane 48 have their axes oriented perpendicular to the longitudinal direction L and thus apply to packages a conveying force acting solely in the longitudinal direction L.

It is necessary that the inner and middle lanes 344, 346 operate so that a package P5 (see FIG. 19) that is wide enough to extend entirely across only the inner and middle lanes 344, 346 will be moved laterally inwardly (as well as longitudinally forwardly), i.e., that the package P5 will be under the control of the inner lane from the standpoint of lateral movement. That is achieved in the preferred embodiment by (a) skewing the rollers 354, 356 of the inner and middle lanes at the same angle relative to the longitudinal direction (as viewed in plan), (b) making the inner rollers 354 longer than the middle rollers 356 so that the width WI of the inner lane is larger than the width WM of the middle lane (i.e., WI>WM), and © driving the inner and middle rollers at the same speed. It will be appreciated, however, that other arrangements are possible for ensuring that the lateral movement of the packages is controlled by the inner lane.

It is also required that a package P6 (see FIG. 21) which is wide enough to extend entirely across all three lanes 344, 346, 348 will be moved laterally inwardly (as well as longitudinally forwardly). As noted above, the middle rollers 356 are unable to move such a package P6 laterally outwardly, so that requirement can be achieved by ensuring that the outer rollers 358 do not impose a sufficiently large lateral outward force on the package which, when combined with the lateral outward force of the middle rollers, is able to overcome the lateral inward force applied by the inner rollers 354. This can be accomplished by arranging the outer rollers 358 such that they impose no lateral force on the packages, preferably by mounting those rollers for rotation about axes oriented perpendicular to the longitudinal direction. Hence, only a longitudinal force would be imposed on the packages by the outer rollers. Of course, it may be possible to skew the outer rollers 358 so that they impart a slight lateral outward or lateral inward force, without causing the inner rollers to lose control over the lateral movement of the packages.

Figure 21:
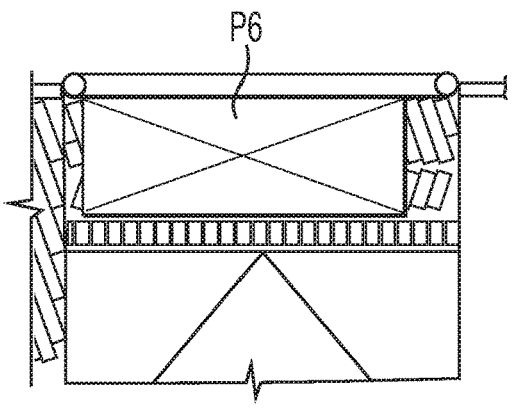
FIG. 21 is a top view showing a package on a conveyed thereon.
Figure 22:
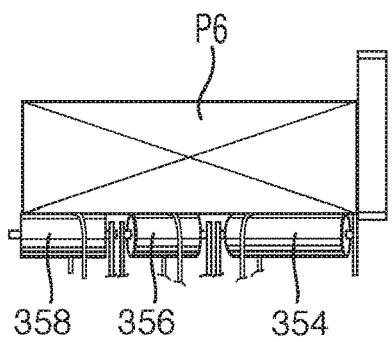
FIG. 22 is a front end view of FIG. 21.
Figure 23:
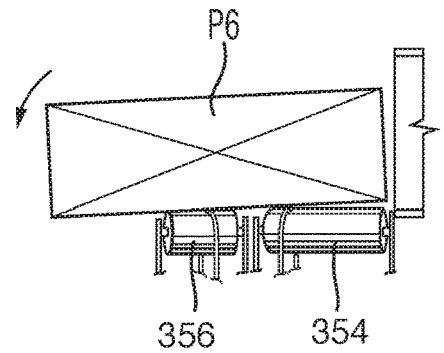
FIG. 23 is a view similar to FIG. 22 depicting a package tipping over onto the removal chute.

The primary purpose for the provision of the outer conveyor lane 348 can be understood with reference to FIGS. 21-23. It will be appreciated that in the absence of the outer lane 348, the package P6 would tilt and rise off the rollers 354 of the inner lane (as shown in FIG. 23), whereupon the package P6 would come under the control of the middle lane and be displaced laterally outwardly off the outer edge of the removal conveyor 340. That is undesirable, as the package P6 is not intended to be removed. However, due to the presence of the outer lane 348, the package P6 will remain seated on all three lanes, and will be urged against the side wall as explained above.

The purpose for providing the outer lane is to prevent the undesired removal of the very wide packages P6 without preventing the desired removal of an outer package traveling abreast of an inner package, as will be later explained in connection with FIG. 24.

A further requirement of the removal conveyor 340 is that a package riding on both the middle and outer lanes, but not on the inner lane (e.g., see the package position P8' shown in FIG. 24), must become oriented so that when discharged onto a downstream conveyor, such as a flow control conveyor 320, the center of gravity CG of the package lies laterally outside of the outer edge 362 of the downstream conveyor and will fall off that edge e62. That is accomplished in the preferred embodiment by making the outer lane 48 shorter in width than the middle lane (i.e., WM>WO), and driving the outer rollers 358 at a speed such that the forward longitudinal speed component of the middle rollers 356 is the same as that of the outer rollers. This involves rotating the outer rollers 58 slightly slower than the middle rollers 356 since the middle rollers are skewed but the outer rollers are not.

Figure 24:
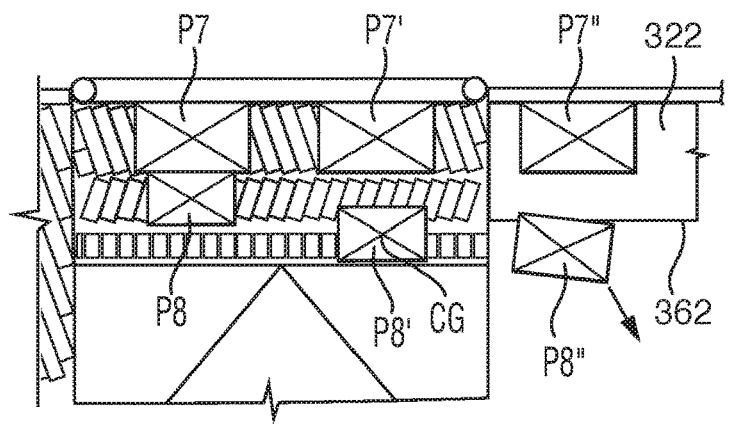
FIG. 24 is a view similar to FIG. 21, depicting packages conveyed over the singulator in a side-by-side relationship with the outer package extending onto a portion of the outside high friction conveyor and being pulled off of the conveyor onto the removal chute.

In FIG. 24, a pair of packages, (i.e., inner and outer packages P7, P8) have exited the singulator in side-by-side relationship, and it is necessary to remove the outer package P8. The inner package P7 comes under the influence solely of the rollers 354 of the inner lane 344 and is advanced thereby longitudinally forwardly and laterally inwardly against the moving side wall 342.

The outer package P8 initially comes under the influence solely of the rollers of the middle lane 346 and is advanced thereby longitudinally forwardly and laterally outwardly toward the outer lane 348. Eventually, the outer package P8 will contact the rollers 358 of the outer lane 48 and assume an equilibrium position P8' partially on the outer lane and partially on the inner lane, whereby the center of gravity CG of the package (assuming that the package is of symmetrical mass) becomes offset laterally outwardly of the outer edge 368 of the middle lane. Hence, when the outer package P8 is transferred onto the flow control conveyor belt 322, its center of gravity will be offset laterally outwardly of the outer edge 362 of that belt 322, whereupon the package P6 will fall off the flow control conveyor belt 322 at position P8". That package P6 can travel down a conveyor of the chute 326 and be collected for recycling back to the singulator conveyor 310.

It will be appreciated that the package P8 would be removed as described above even if an inner edge thereof had been initially riding on the inner lane, i.e., if the package P7 were of slightly less width, because the middle lane would exert lateral control over the package. Hence, such a package would eventually be displaced laterally outwardly to the position P8'.

The outer lane could be arranged to provide a slight lateral inward or outward movement to the packages without adversely affecting the ability of the removal conveyor to remove the outer package. If a slight lateral inward movement is provided, it is merely necessary to ensure that the outer edge 362 of the downstream conveyor 320 is positioned so as to lie laterally inside of the center of gravity of packages being conveyed only by the outer and middle lanes. In doing so, the assumption is made that the packages are symmetrical, i.e., the center of gravity coincides with the geometrical center of the package.

Another embodiment of the invention is depicted in FIG. 25 wherein the removal conveyor 370 comprises a vertical inner side wall comprised of a fixed plate 372. A conveyor mechanism comprises a first or inner conveyor lane 374, a second or middle conveyor lane 376, and an optional third or outer conveyor lane 378, all arranged in parallel as viewed in plan. Those lanes could comprise driven belts or driven rollers.

The first lane 374 has a width W1 which is smaller than the width of the narrowest product. The width W2 of the second lane 376 is preferably greater than the width W1. The width of the optional third lane 378 can be any desired size.

The first and second lane 374, 376 apply first and second conveying forces, respectively, which are mutually divergent. That is, the first lane 374 applies a conveying force having only a forward longitudinal component, and the second lane 376 applies a conveying force having both a forward longitudinal component and a lateral outward component. Thus, the resultant conveying force of the second conveyor is inclined at an obtuse angle with respect to the longitudinal direction. In that event, the speed of the second lane will be set so that it has a forward longitudinal component equal to the forward speed of the first lane, so that a package resting on both of the first and second lanes will travel forwardly without being rotated.

Returning to FIG. 26, the first lane 374 preferably comprises a belt 382; the second lane 376 preferably comprises rollers 384 which are skewed similar to the earlier described rollers 356. The optional third lane 378 preferably comprises rollers 386. Of course, the first lane 374 could instead comprise rollers, and each of the second and third lanes could comprise belts.

Since the first lane 374 is not applying a force having a laterally inward component toward the wall 372 (as in the case of the earlier-described rollers 354), it is necessary to take other measures to ensure that a package engaging both the first and second lanes 374, 376 will be controlled by the first lane. To achieve this, the first lane 374 is provided with a conveying surface having a substantially higher coefficient of friction than the second lane 376. For example, the first lane 374 could comprise a belt (or covered rollers) having a coefficient of friction in the range of about 1.0 to 1.2, and the second lane could comprise rollers whose outer surfaces have a coefficient of friction of about 0.3.

The first lane 374 would exhibit a coefficient of friction three to four times as large as the second lane 376. In the event that a package, such as the package No. 7 in FIG. 25 has a width sufficient to overlap the first and second lanes, the first lane will control the direction of travel of the package, due to its higher coefficient of friction.

In that regard, FIG. 25 depicts the travel pattern of a set of packages Nos. 1-12 as they travel from the singulator conveyor 310 to the removal conveyor 370, and then to the flow control structure 320. It will be appreciated that the in-line package Nos. 1, 5, 6, 7, 10 and 11 which at least partially engage the first lane 374 are conveyed in a longitudinal forward direction L. On the other hand, the package Nos. 2, 3, 4, 8, 9 and 12, which are traveling laterally adjacent the single-file packages and which engage only the second lane 376, are displaced laterally outwardly until reaching the junction with the third conveyor 378 and then are conveyed forwardly on both of those lanes until reaching a downwardly inclined chute 326 of the flow control structure 320. At that point, the package Nos. 2-4, 8, 9 and 12 slide down the chute 326 onto a return conveyor 390 which takes them back to the singulator conveyor 310. Also a downwardly inclined chute 392 is situated alongside the third lane 378 for a similar purpose.

In the absence of the optional third lane 78, package Nos. 2-4, 8, 9 and 12 would have been displaced by the second lane directly onto the chute 92. It might be desirable to provide the first lane 74 in the form of rollers that are slightly skewed in the manner of the earlier described rollers 54 to urge the packages forwardly and laterally inwardly against the wall 72, in addition to providing the higher coefficient of friction.

The method of managing bulk package conveyor flow with a vision management system, comprises the steps of selecting a transition zone between a feed conveyor and a receiving conveyor each one having independent drive means; selecting a camera field of view of the selected transition zone; setting a speed or movement of the feed conveyor, the receiving conveyor, or both the feed conveyor and the receiving conveyor to achieve a desired conveyor area utilization on a down stream receiving conveyor according to the formula V2 (conveyor velocity of incoming items from feed conveyor)=V1 (conveyor velocity outgoing items on receiver conveyor)×2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density); determining a percentage of the feed conveyor occupancy defined zone; determining a percentage of the receiving conveyor occupancy defined zone; selecting a percentage of a desired occupancy of the receiving conveyor after a merger of the packages from the feeding conveyor to the receiving conveyor; selecting a conveyor area including a desired occupancy zone at a selected position; feeding the packages from the feed conveyor to the receiving conveyor occupancy defined zone at a selected rate; conveying the packages toward the desired occupancy zone of the conveyor area at a selected position; and merging the packages at the conveyor area of the transition section between the feed conveyor and the receiving conveyor.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims.

Accordingly, this invention is not intended to be limited by the specific exemplification presented herein above. Rather, what is intended to be covered is within the spirit and scope of the appended claims.

I claim:

1. A method of managing bulk parcel flow with a vision management system, comprising the steps of:
   selecting a transition zone between a feed conveyor and a receiving conveyor each one having independent drive means;
   selecting a camera field of view of the selected transition zone;
   setting the feeding conveyor speed to achieve a desired conveyor area utilization on a down stream receiving conveyor according to a formula V2 (conveyor velocity of incoming items from feed conveyor)=V1 (conveyor velocity outgoing items on receiver conveyor)×2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density);
   determining a percentage of said feed conveyor occupancy defined zone;
   determining a percentage of said receiving conveyor occupancy defined zone;
   selecting a percentage of a desired occupancy of said receiving conveyor after a merger of said parcels from said feeding conveyor to said receiving conveyor; and
   feeding said parcels from said feed conveyor at a selected rate of speed to said receiving conveyor occupancy defined zone; and
   merging said parcels at said conveyor area of said transition section between said feed conveyor and said receiving conveyor.

2. A vision based bulk parcel flow management system, comprising:
   a feed conveyor and a receiving conveyor each one having independent drive motors;
   a transition zone between said feed conveyor and said receiving conveyor;
   a camera field of view of said selected transition zone;
   an inline feeding conveyor speed to achieve a desired conveyor area utilization on a down stream receiving conveyor according to the formula V2 (conveyor velocity of incoming items from feed conveyor)=V1 (conveyor velocity outgoing items on receiver conveyor)× 2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density);
   a camera providing a selected field of view;
   a feeding conveyor having a selected occupancy defined zone;
   a receiving conveyor having a selected occupancy defined zone;
   a section selected included a percentage of the desired occupancy after the merger;
   a receiving conveyor having a selected occupancy defined zone;
   a conveyor area including a desired occupancy zone at a selected position;
   a transition section between said feeding conveyor and said receiving conveyor for merging the parcels from one to another; and
   a computer for controlling said conveyor speed and movement based upon signals received from said cameras identifying gaps between packages on said receiving conveyor of sufficient space for insertion of an additional package from said feeding conveyor.

3. A method of managing bulk package conveyor flow with a vision management system, comprising the steps of:
   selecting a transition zone between a feed conveyor and a receiving conveyor each one having independent drive means;
   selecting a camera field of view of said selected transition zone;
   setting a speed or movement of said feed conveyor, said receiving conveyor, or both said feed conveyor and said receiving conveyor to achieve a desired conveyor area utilization on a down stream receiving conveyor according to the formula V2 (conveyor velocity of incoming items from feed conveyor)=V1 (conveyor velocity outgoing items on receiver conveyor)×2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density);
   determining a percentage of said feed conveyor occupancy defined zone;
   determining a percentage of said receiving conveyor occupancy defined zone;
   selecting a percentage of a desired occupancy of said receiving conveyor after a merger of said packages from said feeding conveyor to said receiving conveyor;
   selecting a conveyor area including a desired occupancy zone at a selected position;
   feeding said packages from said feed conveyor to said receiving conveyor occupancy defined zone at a selected rate;
   conveying said packages toward said desired occupancy zone of said conveyor area at a selected position; and
   merging said packages at said conveyor area of said transition section between said feed conveyor and said receiving conveyor.

4. The method of managing bulk package conveyor flow with a vision management system of claim 3 further comprising the steps of monitoring and controlling speed and movement of said feed conveyor and said receiver conveyor with a computer based upon signals received from said camera identifying a gap between packages on said receiving conveyor of sufficient space for insertion of an additional package from said feeding conveyor.

5. The method of managing bulk conveyor package flow with a vision management system of claim 3 including the step of providing multiple cameras to monitor selected positions of said conveyor flow.

6. The method of managing bulk package conveyor flow with a vision management system of claim 5 including the step of providing an IP address to each camera.

7. The method of managing bulk package conveyor flow with a vision management system of claim 3, including the step of setting a speed or movement of said feed conveyor, said receiving conveyor, or both said feed conveyor and said receiving conveyor as a function of occupancy on a collector.

8. The method of managing bulk package conveyor flow with a vision management system of claim 3, including the step of setting a speed or movement of said feed conveyor, said receiving conveyor, or both said feed conveyor and said receiving conveyor as a function of occupancy just prior to conveyance of said packages onto a singulator.

9. A vision based bulk package conveyor flow management system, comprising:
a feed conveyor and a receiving conveyor each one having independent drive means;
a transition zone between said feed conveyor and said receiving conveyor;
at least one camera providing a selected field of view of said selected transition zone, a selected occupancy zone, or said selected transition zone and said selected occupancy zone;
said feed conveyor, said receiver conveyor, or both said feed conveyor and said receiver conveyor conveying at a selected speed or time to achieve a desired conveyor area occupancy on a down stream receiving conveyor wherein said occupancy comprises conveyor area, conveyor volume, or conveyor density);
said feed conveyor having a selected occupancy defined zone;
said receiving conveyor having a selected occupancy defined zone;
a transition section between said feed conveyor and said receiving conveyor for merging a plurality of packages from one to the other;
said selected transition section including a percentage of the desired occupancy of said receiving conveyor after the merger of said packages from said feed conveyor to said receiving conveyor;
a conveyor area including a desired occupancy zone at a selected position; and
a computer for controlling said conveyor speed and movement based upon signals received from said cameras identifying gaps between said packages on said receiving conveyor of sufficient space for insertion of an additional package from said feeding conveyor.

10. The vision based bulk package conveyor flow management system of claim 9 wherein said conveyor area comprises a collector.

11. The vision based bulk package conveyor flow management system of claim 9 wherein said conveyor area comprises a singulator for receiving and sorting packages.

12. The vision based bulk package conveyor flow management system of claim 11, wherein said singulator comprises an inner conveying lane, a middle conveying lane, at least one outer parallel conveying lane, and an upright side wall disposed adjacent an inner edge of said inner lane, said inner conveying lane, said middle conveying lane, and said at least one outer parallel conveying lane arranged to advance articles longitudinally forwardly, said inner lane arranged to range articles laterally inwardly toward said side wall, and said middle lane arranged to urge articles laterally outwardly away from said side wall.

13. The vision based bulk package conveyor flow management system of claim 11, wherein said singulator comprises a conveyor mechanism for conveying single-file articles in a forward direction while removing articles traveling laterally adjacent the single-file articles, the conveyor mechanism comprising first and second driven conveyor structures respectively forming first and second conveying lanes disposed in parallel as viewed in plan and situated immediately adjacent one another; the first and second conveying lanes applying first and second conveying forces, respectively, which are divergent relative to one another; the first conveying force including a forward directional component; the second conveying force including a lateral directional component extending away from the first lane to move articles away from the first lane that are out of contact with the first lane.

14. The vision based bulk package conveyor flow management system of claim 13, wherein said first conveying lane having a surface having a substantially higher coefficient of friction than said second conveying surface.

15. The vision based bulk package conveyor flow management system of claim 13, wherein said first conveying force has no lateral directional component.

16. The vision based bulk package conveyor flow management system of claim 13, wherein said second conveying force includes a forward directional component in addition to said lateral directional component.

17. The vision based bulk package conveyor flow management system of claim 13, wherein a speed of articles conveyed by said first lane has a forward directional component equal to a forward directional component of a speed of articles conveyed by said second lane.

18. The vision based bulk package conveyor flow management system of claim 13, wherein said second conveying lane is disposed at a lower elevation than said first lane.

19. The vision based bulk package conveyor flow management system of claim 13, wherein said second conveying lane is inclined downwardly toward said first lane.

20. The vision based bulk package conveyor flow management system of claim 13, wherein a width of said first conveying lane is less than a width of a narrowest article being conveyed by said conveyor mechanism.

21. The vision based bulk package conveyor flow management system according to claim 13, including an accumulator conveyor in flow communication with said receiving conveyor for feeding packages to a longitudinal center line of a first conveying lane of said singulator.

22. A vision based bulk parcel flow management system, comprising:
a feed conveyor having a selected feed conveyor occupancy defined zone;
a camera having a field of view of said feed conveyor occupancy defined zone;
said receiving conveyor having a selected receiving conveyor occupancy defined zone;
a camera having a field of view of said receiving conveyor occupancy defined zone;
a camera field of view of said receiving conveyor occupancy defined zone;
said feed conveyor and said receiving conveyor each one having independent drive motors and variable speed controllers;
said feed conveyor speed controlled to achieve a desired conveyor area occupancy on said receiving conveyor wherein said occupancy comprises conveyor area, conveyor volume, or conveyor density); and
a computer for controlling said conveyor speed and movement based upon data received from said camera having a field of view of said feed conveyor occupancy defined zone and data received from said camera having a field of view of said receiving conveyor occupancy defined zone for identifying gaps between packages on said receiving conveyor having sufficient space for insertion of an additional package from said feeding conveyor.

23. The vision based bulk package conveyor flow management system of claim 22 further including a singulator for receiving and sorting packages.

24. The vision based bulk package conveyor flow management system of claim 22, wherein said singulator comprises a conveyor mechanism for conveying single-file articles in a forward direction while removing articles traveling laterally adjacent the single-file articles, the conveyor mechanism comprising first and second driven conveyor structures respectively forming first and second conveying lanes disposed in parallel as viewed in plan and situated immediately adjacent one another; the first and second conveying lanes applying first and second conveying forces, respectively, which are divergent relative to one another; the first conveying force including a forward directional component; the second conveying force including a lateral directional component extending away from the first lane to move articles away from the first lane that are out of contact with the first lane.

25. The vision based bulk package conveyor flow management system of claim 24, wherein said first conveying lane having a surface having a substantially higher coefficient of friction than said second conveying surface.

26. The vision based bulk package conveyor flow management system of claim 24, wherein said first conveying force has no lateral directional component.

27. The vision based bulk package conveyor flow management system of claim 24, wherein said second conveying force includes a forward directional component in addition to said lateral directional component.

28. The vision based bulk package conveyor flow management system of claim 24, wherein a speed of articles conveyed by said first lane has a forward directional component equal to a forward directional component of a speed of articles conveyed by said second lane.

29. The vision based bulk package conveyor flow management system of claim 24, wherein said second conveying lane is disposed at a lower elevation than said first lane.

30. The vision based bulk package conveyor flow management system of claim 24, wherein said second conveying lane is inclined downwardly toward said first lane.

31. The vision based bulk package conveyor flow management system of claim 24, wherein a width of said first conveying lane is less than a width of a narrowest article being conveyed by said conveyor mechanism.

32. The vision based bulk package conveyor flow management system according to claim 13, including an accumulator conveyor in flow communication with said receiving conveyor for feeding packages to a longitudinal center line of a first conveying lane of said singulator.

33. The vision based bulk package conveyor flow management system of claim 24, wherein said an inline feeding conveyor speed is controlled to achieve a desired conveyor area utilization on a down stream receiving conveyor according to the formula V2 (conveyor velocity of incoming items from feed conveyor)=V1 (conveyor velocity outgoing items on receiver conveyor)×2×(DO %)/(RCO %+FCO %) where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density).

34. The vision based bulk package conveyor flow management system of claim 22, wherein said singulator comprises an inner conveying lane, a middle conveying lane, at least one outer parallel conveying lane, and an upright side wall disposed adjacent an inner edge of said inner lane, said inner conveying lane, said middle conveying lane, and said at least one outer parallel conveying lane arranged to advance articles longitudinally forwardly, said inner lane arranged to range articles laterally inwardly toward said side wall, and said middle lane arranged to urge articles laterally outwardly away from said side wall.

* * * * *